US012726593B2

(12) United States Patent
Ma et al.

(10) Patent No.: US 12,726,593 B2
(45) Date of Patent: Sep. 1, 2026

(54) METHODS, APPARATUSES, DEVICES AND STORAGE MEDIUMS FOR INTERACTION IN VIRTUAL ENVIRONMENTS

(71) Applicant: Beijing Zitiao Network Technology Co., Ltd., Beijing (CN)

(72) Inventors: Xindu Ma, Beijing (CN); Jinjia Huang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 209 days.

(21) Appl. No.: 18/531,991

(22) Filed: Dec. 7, 2023

(65) Prior Publication Data

US 2024/0214525 A1 Jun. 27, 2024

(30) Foreign Application Priority Data

Dec. 21, 2022 (CN) ......................... 202211652521.6
Dec. 22, 2022 (CN) ......................... 202211658215.3
Dec. 23, 2022 (CN) ......................... 202211665364.2

(51) Int. Cl.
*H04N 7/15* (2006.01)

(52) U.S. Cl.
CPC ............. *H04N 7/157* (2013.01); *H04N 7/152* (2013.01)

(58) Field of Classification Search
CPC ............................... H04N 7/157; H04N 7/152
See application file for complete search history.

(56) References Cited

U.S. PATENT DOCUMENTS 11,082,661 B1 * 8/2021 Pollefeys ................. H04N 7/15
2011/0025819 A1 * 2/2011 Gorzynski ............. H04N 7/147 348/E7.083
2012/0281059 A1 * 11/2012 Chou .................. H04L 12/1827 348/E7.083
2014/0098183 A1 * 4/2014 Smith .................. H04N 9/3185 348/E7.083
2014/0354764 A1 * 12/2014 Avni ....................... G06T 11/60 348/14.09
2023/0086906 A1 * 3/2023 Tang ....................... G06T 11/00 715/753
2023/0385767 A1 * 11/2023 Faulkner ............... H04L 67/306
2024/0106875 A1 * 3/2024 Cho ....................... H04N 7/157

FOREIGN PATENT DOCUMENTS

CN 107071334 A 8/2017
CN 108509526 A 9/2018
CN 108732754 A 11/2018
(Continued)

*Primary Examiner* — Stella L. Woo
(74) *Attorney, Agent, or Firm* — Astute IP Law Group

(57) ABSTRACT

According to embodiments of the present disclosure, methods, apparatuses, devices and storage mediums for interaction in virtual environments are provided. A method comprises presenting a first conference layout for a virtual conference in the virtual environment; detecting a change in participants and/or conference modes of the virtual conference; and adjusting the first conference layout to a second conference layout based at least in part on the change. Embodiments herein can lower communication obstacles for participants, reduce production costs of conference layouts, simplify operations to modify conference layouts, and enhance user experience.

9 Claims, 15 Drawing Sheets

(56) References Cited

FOREIGN PATENT DOCUMENTS

| | | | |
|---|---|---|---|
| CN | 109274924 | A | 1/2019 |
| CN | 112399132 | A | 2/2021 |
| CN | 112083859 | B | 10/2021 |
| CN | 113934294 | A | 1/2022 |
| CN | 110692031 | B | 10/2022 |

* cited by examiner 210
220-1
230-2
220-3
230-4
220-5

METHODS, APPARATUSES, DEVICES AND STORAGE MEDIUMS FOR INTERACTION IN VIRTUAL ENVIRONMENTS

This application claims the benefit of CN Patent Application No. 202211665364.2 filed on Dec. 23, 2022, entitled "METHOD FOR INTERACTION, APPARATUS, ELECTRONIC DEVICE AND STORAGE MEDIUMIN VIRTUAL ENVIRONMENT", CN Patent Application No. 202211652521.6 filed on Dec. 21, 2022, entitled "METHOD FOR INTERACTION, APPARATUS, ELECTRONIC DEVICE AND STORAGE MEDIUMIN VIRTUAL ENVIRONMENT", CN Patent Application No. 202211658215.3 filed on Dec. 22, 2022, entitled "METHOD FOR INTERACTION, APPARATUS, ELECTRONIC DEVICE AND STORAGE MEDIUMIN VIRTUAL ENVIRONMENT", which are hereby incorporated by reference in its entirety.

FIELD

Example embodiments of the present disclosure relates generally to the field of computer technologies, and more particularly, to methods, apparatuses, devices and computer-readable storage mediums for interaction in virtual environment.

BACKGROUND

In the future, human interaction patterns will shift from 2D interaction to more efficient 3D interaction. 3D visual interaction systems depend on the development of virtual reality (VR), augmented reality (AR), and mixed reality (MR), collectively referred to as "extended reality" (XR). For example, users can hold conferences in a virtual environment based on XR.

SUMMARY

In a first aspect of the present disclosure, a method for interaction in a virtual environment is provided. The method comprises: presenting a first conference layout for a virtual conference in the virtual environment; detecting a change in participants and/or conference modes of the virtual conference; and adjusting the first conference layout to a second conference layout based at least in part on the change.

In the second aspect of the present disclosure, an apparatus for interaction in a virtual environment is provided. The apparatus comprises: a first conference layout presentation module configured to present a first conference layout for a virtual conference in the virtual environment; a change detection module configured to detect a change in participants and/or conference modes of the virtual conference; and a second conference layout adjustment module configured to adjust the first conference layout to a second conference layout based at least in part on the change.

In the third aspect of the present disclosure, an electronic device is provided. The device comprises at least one processing unit; and at least one memory, the at least one memory being coupled to the at least one processing unit and storing instructions for execution by the at least one processing unit. The instructions, when executed by the at least one processing unit, cause the device to perform the method of the first aspect.

In the fourth aspect of the present disclosure, a computer-readable storage medium is provided. The computer-readable storage medium stores a computer program that can be executed by a processor to implement the method of the first aspect.

In the fifth aspect of the present disclosure, a method for interaction in a virtual environment is provided. The method comprises: determining a reference position associated with a user's virtual avatar in the virtual environment; and presenting a window specific to the user's virtual avatar at a target position in the virtual environment, the window displaying shared content in the virtual environment, an orientation and/or a size of the window in the virtual environment being determined based on the reference position.

In the sixth aspect of the present disclosure, an apparatus for interaction in a virtual environment is provided. The apparatus comprises: a reference position determination module configured to determine a reference position associated with a user's virtual avatar in the virtual environment; and a window presentation module configured to present a window specific to the user's virtual avatar at a target position in the virtual environment, the window displaying shared content in the virtual environment, an orientation and/or a size of the window in the virtual environment being determined based on the reference position.

In the seventh aspect of the present disclosure, an electronic device is provided. The device comprises at least one processing unit; and at least one memory, the at least one memory being coupled to the at least one processing unit and storing instructions for execution by the at least one processing unit. The instructions, when executed by the at least one processing unit, cause the device to perform the method of the fifth aspect.

In the eighth aspect of the present disclosure, a computer-readable storage medium is provided. The computer-readable storage medium stores a computer program that, when executed by a processor, implements the method of the fifth aspect.

In the ninth aspect of the present disclosure, a method for interaction in a virtual environment is provided. The method comprises: rendering a virtual scene allowing content sharing; and presenting at least a first content sharing window and a second content sharing window in an overlapping style in the virtual scene, the first content sharing window having a higher priority than the second content sharing window, and a first depth of field from the first content sharing window to a current viewpoint being smaller than a second depth of field from the second content sharing window to the current viewpoint.

In the tenth aspect of the present disclosure, an apparatus for interaction in a virtual environment is provided. The apparatus comprises a rendering module configured to render a virtual scene allowing content sharing; and a presentation module configured to present at least a first content sharing window and a second content sharing window in an overlapping style in the virtual scene, the first content sharing window having a higher priority than the second content sharing window, and a first depth of field from the first content sharing window to a current viewpoint being smaller than a second depth of field from the second content sharing window to the current viewpoint.

In the eleventh aspect of the present disclosure, an electronic device is provided. The device includes at least one processing unit; and at least one memory, the at least one memory being coupled to the at least one processing unit and storing instructions for execution by the at least one processing unit. The instructions, when executed by the at least one processing unit, cause the device to perform the method of the ninth aspect.

In the twelfth aspect of the present disclosure, a computer-readable storage medium is provided. The computer-readable storage medium stores a computer program that, when executed by a processor, implements the method of the ninth aspect.

It should be understood that the contents described in the content section of the present invention are not intended to limit the key features or important features of the embodiments of the present disclosure, nor are they intended to limit the scope of the present disclosure. Other features of the present disclosure will become readily understood from the following description.

BRIEF DESCRIPTION OF THE DRAWINGS

In conjunction with the accompanying drawings and with reference to the following detailed description, the above and other features, advantages and aspects of the various embodiments of the present disclosure will become more apparent.

DETAILED DESCRIPTION

Figures 1, 2:
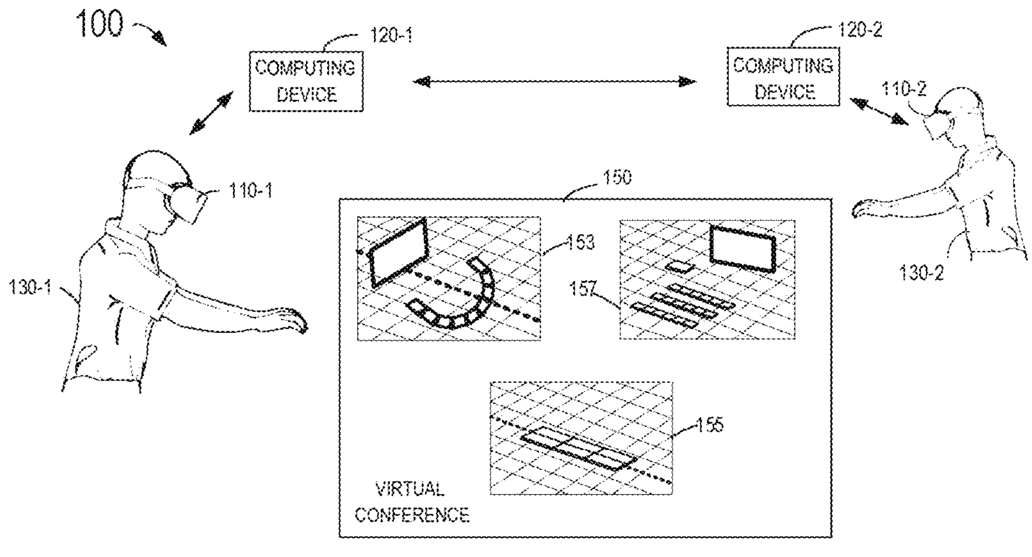
FIG. 1 shows a schematic diagram of an example environment 100 in which embodiments of the present disclosure can be implemented.
FIG. 2 shows a schematic diagram of the layout of the virtual conference in discussion mode according to some embodiments of the present disclosure.

The following will describe embodiments of the present disclosure in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

In the description of embodiments of the present disclosure, the term "including" and similar terms should be understood as open-ended inclusion, that is, "including but not limited to". The term "based on" should be understood as "at least partially based on". The term "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

In the description of embodiments of the present disclosure, the term "XR" includes but is not limited to "VR", "AR", "MR", etc. It should be understood that the term "XR" can be any one of "VR", "AR", and "MR", or any combination thereof. In the following description, for convenience of description only, "XR" is used in embodiments of the present disclosure to refer to one or more of "VR", "AR", and "MR", or any combination thereof.

The term "in response to" indicates that the corresponding event occurs or the condition is satisfied. It will be understood that the timing of subsequent actions executed in response to the event or condition is not necessarily strongly related to the time when the event occurs or the condition is satisfied. In some cases, subsequent actions can be executed immediately when the event occurs or the condition is satisfied; in other cases, subsequent actions can also be executed after a period of time after the event occurs or the condition is satisfied.

It can be understood that the data involved in this technical solution (including but not limited to the data itself, the acquisition or use of data) should comply with the requirements of corresponding laws, regulations, and relevant provisions.

It will be appreciated that, before using the technical solutions disclosed in each embodiment of the present disclosure, should be in accordance with relevant laws and regulations through an appropriate manner to inform the user of the type of personal information involved in the present disclosure, the scope of use, usage scenes, and obtain the user's authorization.

For example, in response to receiving an active request from a user, transmits a prompt message to the user to explicitly prompt the user, the operation requested to be performed will need to obtain and use the user's personal information, so that the user can be based on the prompt information autonomously select whether to provide personal information to the electronic device, application, server, or storage medium software or hardware that performs the operation of the present disclosure.

As an optional but non-limiting implementation, in response to receiving an active request from the user, a prompt message is sent to the user, for example, in the form of a pop-up window, in which the prompt message can be presented in text. In addition, the pop-up window can also carry a selection control for the user to "agree" or "disagree" to provide personal information to the electronic device.

It can be understood that the above notification and user authorization process are only illustrative and do not limit the implementation of this disclosure. Other methods that meet relevant laws and regulations can also be applied to the implementation of this disclosure.

As briefly mentioned earlier, in the XR virtual environment, the virtual avatar corresponding to the user can hold a conference in the conference scene. As an example, the conference scene can be divided into various types of conference modes, such as discussion mode, face-to-face mode, speech mode, and so on. Different types of conference modes can correspond to different conference layouts. The conference layout in discussion mode can, for example, set a plurality of conference tables and/or seats in front of a sharing window (such as a shared screen drawn in the virtual environment). The conference layout of the face-to-face mode can, for example, set two parallel rows of conference tables facing each other in the conference scene. The conference layout of the speech mode can, for example, set a speech table and an audience seat in front of the sharing window. The audience seat consists of at least one row of conference tables and/or seats.

Currently, each conference mode corresponds to a fixed conference layout. Usually, the conference layout is set according to the range of possible participants, such as a fixed number of conference tables and/or seats. For example, setting a conference layout with 4 conference tables used by 4 people, setting a conference layout with 6 conference tables used by 6 people, and setting a conference layout with 8 conference tables used by 8 people. However, on the one hand, a fixed conference layout will result in redundant conference tables and/or seats when it is not full. In the XR virtual environment, because the virtual avatar of a specific user interacts with the virtual avatars of other users participating in the conference from a first-person perspective, redundant conference tables and/or seats may hinder the interaction between the virtual avatars of various users participating in the conference. On the other hand, if new participants join before or during the conference, and the conference tables and/or seats cannot meet the current number of participants, a new conference layout needs to be created or the original conference layout needs to be modified. It is impossible to join and replace conference tables and/or seats as flexibly as in the real environment, resulting in high production costs for the conference layout.

Embodiments of the present disclosure proposes an interactive virtual environment. According to various embodiments of the present disclosure, a first virtual conference layout for the conference is presented in a virtual environment; a change in the participants of the virtual conference and/or conference mode is detected; the first conference layout is adjusted to the second conference layout based at least in part on the change.

In this way, embodiments of the present disclosure present a first conference layout for a virtual conference in a virtual environment and enable the adjustment from the first conference layout to the second conference layout by detecting a change in the participants and/or conference mode of the virtual conference.

As such, regardless of the type of conference mode, the corresponding conference layout can adapt to the dynamic changes in the number of participants, lower the communication obstacles of participants, reduce the production cost of the conference layout, simplify the operation of modifying the conference layout, and enhance the user experience.

Some embodiments of the present disclosure will be described in conjunction with the accompanying drawings. It will be understood from the following description, according to embodiments of the present disclosure, provides a user with a program for interaction in a virtual environment.

FIG. 1 shows a schematic diagram of an example environment 100 in which embodiments of the present disclosure can be implemented. There are a plurality of users in this example environment 100, collectively or individually referred to as user 130 for ease of description. For example, there can be two users 130-1 and user 130-2. User 130 can wear an XR device, collectively or individually referred to as the XR device 110 for ease of description. For example, user 130-1 wears the XR device 110-1, and user 130-2 wears the XR device 110-2.

Computing devices establish virtual scenes for a plurality of users or merge virtual content with real scenes. For convenience of description, they are collectively or separately referred to as computing devices 120, such as the computing devices 120-1 and 120-2. For example, the XR device 110-1 communicates with the computing device 120-1 to rebuild virtual scenes for users 130-1 or merge virtual content with real scenes; the XR device 110-2 communicates with the computing device 120-2 to rebuild virtual scenes for users 130-2 or merge virtual content with real scenes.

In some embodiments, the computing devices 120-1 and 120-2 may communicate wirelessly to build a common virtual scene for users 130-1 and 130-2, without limiting a plurality of users must be in the same physical space. In the present disclosure, virtual scenes reconstructed based on VR technology, and scenes where virtual content and real scenes are fused based on AR technology or MR technology are collectively referred to as virtual scenes 150.

In some embodiments, the virtual scene 150 may present a scene of at least one virtual conference. Virtual conference may refer to a conference organized in an XR-based virtual environment. In such a virtual conference, participating parties (also referred to as participants) can, for example, interact with virtual avatars of other participants in an immersive XR scene to achieve the effect of a face-to-face conference.

In some embodiments, according to the requirements of the virtual conference, the virtual scene 150 may present a plurality of scenes for virtual conferences with various modes, such as a scene 153 for virtual conference in discussion mode, a scene 155 for virtual conference in face-to-face mode, and a scene 157 for virtual conference in speech mode. It should be understood that the virtual scene 150 is merely for illustration and is not intended to limit the scope of the present disclosure.

In some embodiments, the conference mode corresponding to the virtual scene 150 can be determined based on the configuration information associated with the virtual conference. Such a determination can not only improve the efficiency of determining the conference mode, but also make the conference mode and the virtual conference scene conference configuration information are accurately corresponding to each other, thereby enabling more accurate selection of the conference mode.

For example, computing device 120 can generate conference configuration information used in virtual conference scenes. Such conference configuration information can indicate, for example, the maximum number of participants in the virtual conference, user access methods in the virtual conference, conference frequency, speaking permissions of different users, speaking order of users, etc. The computing device 120 can automatically determine the adapted conference mode based on such conference configuration information. For example, if only a specific user is configured with speaking permissions, the computing device 120 can determine that the virtual conference will use "speech mode".

In some embodiments, the conference configuration information may also be set by an organizer of the virtual conference, and the computing device 120 may determine the conference mode based on the set conference configuration information accordingly. For example, before initiating the virtual conference, the conference organizer may specify that the virtual conference will be in "face-to-face mode".

In some embodiments, the computing device 120 may also determine the conference mode based on the number of participants in the virtual conference. Such a determination may select a conference mode more adaptive to the interaction pattern of the participating users and their interaction experience. For example, the computing device 120 may employ a "face-to-face mode" if the number of participants is less than a first threshold, and a "discussion mode" if the number of participants reaches a second threshold.

The XR device 110 can be a head-mounted or wearable near-eye display device, such as Head Mounted Display, smart glasses, etc., supporting technologies such as VR, AR, MR, etc. The XR device 110 can include image generation components and optical display components for reconstructing virtual scenes 150 in a monocular or binocular field of view and displaying virtual objects. Virtual objects can include three-dimensional virtual objects and/or two-dimensional virtual objects. Two-dimensional virtual objects can include two-dimensional windows without thickness for presenting various contents in virtual scenes 150 similar to electronic screens. For example, two-dimensional virtual objects can include sharing windows for displaying content that needs to be shared in virtual conferences. Three-dimensional virtual objects can include various virtual avatars corresponding to users. For example, users 130 participating in virtual conferences (e.g., users 130-1 and 130-2) can wear the XR devices 110 (e.g., the XR devices 110-1 and 110-2) so that the corresponding virtual avatars are presented in virtual scenes 150. Three-dimensional virtual objects can also include various objects such as those required in virtual conferences like tables, chairs and so on.

It can be understood that the virtual avatar corresponding to the user can move in the virtual environment 150. For example, the virtual avatar can enter and exit different modes of virtual conference scenes or move in the same virtual conference scene. In the virtual conference scene, the virtual avatar can move to a fixed position or between different positions. The user 130 can also adjust the posture, action, etc. of the corresponding virtual avatar through the XR device 110.

It should be understood that the structure and function of environment 100 are described for illustrative purposes only, without implying any limitation on the scope of the present disclosure.

In the following descriptions of the example embodiments of the present disclosure in conjunction with the accompanying drawings, virtual conferences in discussion mode, face-to-face mode and speech mode will be discussed for illustration.

Scene 1

In some embodiments, the computing device 120 establishes a scene 153 for a virtual conference in discussion mode for a plurality of users. The plurality of virtual avatars of the users can discuss common topics or take activities in the same virtual space, i.e., the scene 153 for the virtual conference in discussion mode.

As an example, as shown in FIG. 1, the computing devices 120-1 and 120-2 can communicate wirelessly to construct a common scene 153 for a virtual conference in discussion mode for users 130-1 and 130-2, so that the virtual avatars of users 130-1 and 130-2 are in the scene 153 for the virtual conference in discussion mode.

FIG. 2 shows a schematic diagram of a conference layout in a virtual conference in discussion mode according to some embodiments of the present disclosure. As shown, the conference layout of the virtual conference in discussion mode is presented in the scene 153 for the virtual conference in discussion mode. The computing device 120 can pre-set coordinates of a reference position, so that content can be shared at the reference position. For example, a sharing window 210 for content sharing is presented at the reference position in the scene 153 for virtual conference in discussion mode. The sharing window 210 can present audiovisual content, for example.

Alternatively, or in addition, the reference position of the sharing window 210 may be the coordinates of the midpoint of the long side of the sharing window 210. Alternatively, or in addition, the reference position of the sharing window 210 may also be the coordinates of the center point of the sharing window 210. Embodiments of the present disclosure are not particularly limited in this regard.

The conference position can be set at the target position relative to the reference position. For example, the conference position can be a conference table. The conference table constitutes the desktop area required by the participants. In some embodiments, the desktop area can be in a semicircular shape, and the semicircular desktop area faces the sharing window 210, so that the participants sit around the outside of the desktop area (the outside of the semicircle) facing the sharing window 210 for discussion. Alternatively, or in addition, the desktop area can also be in a semi-elliptical shape. The computing device 120 can adaptively adjust the position and shape of the desktop area according to the participants' field of view for the sharing window 210. Embodiments of the present disclosure are not particularly limited in this regard.

As an example, the desktop area can be made up of a plurality of individual conference tables. Alternatively, or in addition, the conference table has a rectangular shape. Alternatively, or in addition, the conference table can also have a fan shape, and embodiments of the present disclosure are not specifically limited in this regard.

As shown in FIG. 2, for ease of description, the conference tables that make up the desktop area are collectively or individually referred to as conference table 220. For example, the desktop area includes conference table 220-1, conference table 220-3, conference table 220-5, and so on. Since the desktop area has a semi-circular shape and the conference table 220 has a rectangular shape, in order to make the desktop area smooth, connecting components can be set between adjacent conference tables. For example, the desktop area includes connecting components 230-2, 230-4, and so on. For ease of description, these connecting components are collectively or individually referred to as connecting components 230. Connecting components 230-2 are used to connect conference table 220-1 and 220-3; connecting components 230-4 are used to connect conference table 220-3 and 220-5; and so on. The number of conference tables 220 and connecting components 230 can be determined based on the number of participants.

In the scene 153 for the virtual conference in discussion mode, the number of users participating in the conference will change in real time as the conference theme or activity theme changes. Alternatively, during the conference, the number of users participating in the conference will also change. In these cases, when the number of users participating in the conference changes, the computing device 120 needs to adjust the conference layout to adapt to the current number of users participating in the conference. On the other hand, in the same conference, users participating in the conference may adjust their positions at any time. Therefore, when the position of users participating in the conference changes, the computing device 120 needs to adjust the conference layout.

In some embodiments, the computing device 120 may determine a second conference layout based on the number of participants in the virtual conference and the reference position of the content sharing, to adjust the first conference layout to the second conference layout. For example, participants may be a virtual avatar of the user.

In some embodiments, the computing device 120 detects a change in the participants of the virtual conference, such as the change in the number of participants. For example, at some point before the virtual conference begins or during the virtual conference, one or more participants temporarily decide to join or exit the scene 153 for the virtual conference in discussion mode. At this time, it is necessary to adjust the first conference layout of the virtual conference to accommodate the number of new participants.

In some embodiments, the computing device 120 may dynamically adjust the number and layout of conference positions with changes in the number of participants. For example, the number and layout of conference positions are dynamically adjusted with changes in the number of participants. As an example, the computing device 120 may dynamically adjust the number and layout of the conference table 220 with changes in the number of participants in the scene 153 for the virtual conference in discussion mode, thereby adjusting the shape of the desktop area. For example, the semicircular shape of the desktop area extends dynamically with the increase of the number of participants. During the extension process, the conference tables 220 located at both ends of the desktop area always remain in a relative state, so that the newly joined participants are in a face-to-face state. The computing device 120 uses the connecting components 230 to automatically merge and connect the conference tables 220 into a new desktop area which still has a semicircular shape.

In order to make the participants have a better visual experience for the sharing window 210, the computing device 120 can also adjust the layout of the conference positions in connection with the reference position for content sharing (such as the center point of the sharing window, the midpoint of the long side of the sharing window, etc.). For example, in the first conference layout, the connection between the center position associated with the semi-circular desktop area and the reference position is used as a reference line, and the conference tables 220 located on both sides of the reference line are symmetrically distributed. It can be understood that each participant sitting outside the desktop area has a relatively better visual field when viewing the sharing window 210.

Figure 3A:
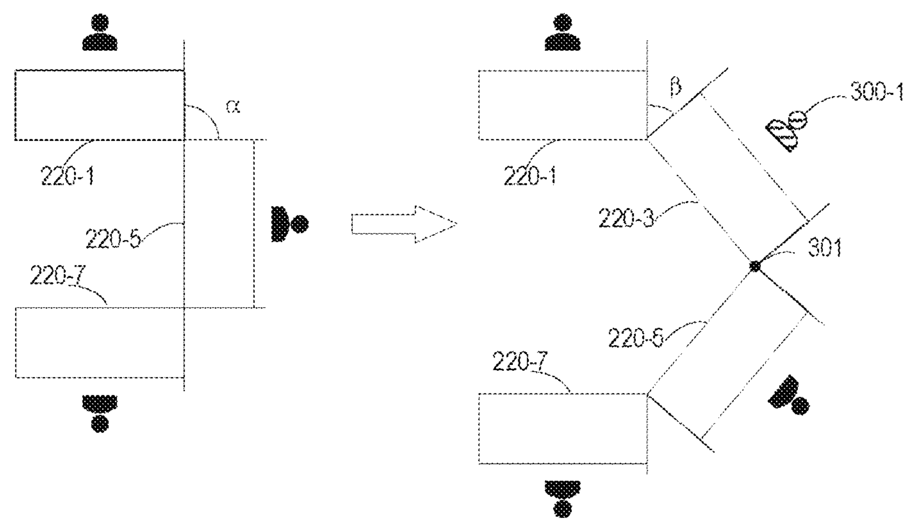
FIG. 3A shows a schematic diagram of dynamic adjustment for an odd number of conference tables according to some embodiments of the present disclosure.
Figure 3B:
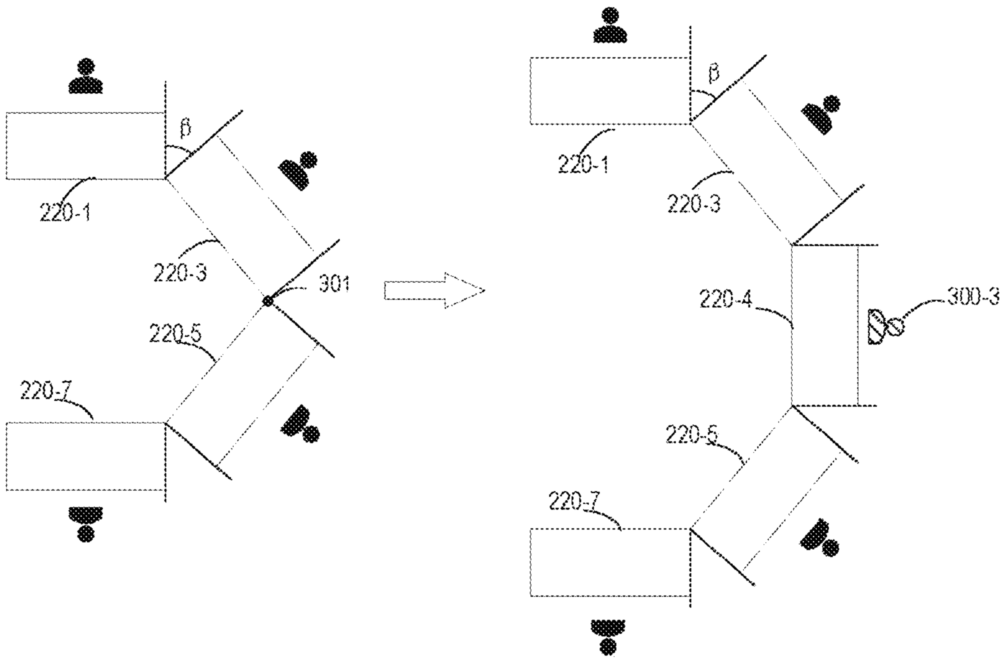
FIG. 3B shows a schematic diagram of dynamic adjustment for an even number of conference tables according to some embodiments of the present disclosure.

In conjunction with FIGS. 3A and 3B, the first conference layout is adjusted to the second conference layout in conjunction with the reference position for content sharing when the number of participants changes. The following is an example of dynamically adjusting the number and layout of conference tables 220.

In some embodiments, if the number of participants is odd, the computing device 120 may set a central conference position at a target position relative to the reference position and symmetrically set a plurality of further conference positions based on the reference position and the target position. As an example, the computing device 120 may set the central conference position at a target position having a given distance from the reference position. The plane to which the connection between the target position and the reference position belongs can be perpendicular to the plane of the sharing window, so that the participants located at the central conference position can be directly in front of the sharing window to view it. The plurality of further conference positions are symmetrically provided on both sides of the connection between the reference position and the target position, i.e., on the left and right sides of the central conference position. For example, a row of conference positions are symmetrically provided on both sides of the connection between the reference position and the target position, and the row of conference positions can be parallel to the sharing window at the reference position. As another example, the plurality of conference positions can be symmetrically provided on both sides of the connection between the reference position and the target position, and the plurality of conference positions can be in a shape of arc.

FIG. 3A shows a schematic diagram of dynamically adjusting conference tables of an odd number according to some embodiments of the present disclosure. As shown, for example, the desktop area presented with the first conference layout may include an odd number (e.g., three) of conference tables 220. For example, adjacent conference tables 220-1, 220-5, and 220-7 are arranged. Conference tables 220-1 and 220-7 face to each other, and conference tables 220-5 are located between conference tables 220-1 and 220-7. The desktop area formed by these three conference tables is semi-circular. The participants at conference tables 220-1 and 220-7 face each other. Conference table 220-5, as the central conference position, can be in parallel with the sharing window at the reference position, so that the participants at the central conference position have a better view of the sharing window. The angle between adjacent conference tables 220 is the unit angle which can be 180°/(the number of participants−MOD (the number of participants, 2)), for example, where MOD is the modulus. In the example of FIG. 3A, the unit angle between conference table 220-1 and conference table 220-5, and the unit angle between conference table 220-5 and conference table 220-7 are both α (90°).

For example, when participant 300-1 enters the scene for the virtual conference in discussion mode as a participating party, the computing device 120 needs to add a conference table 220-3 to the scene 153 for the virtual conference in discussion mode to provide a conference table for participant 300-1. For example, as shown in FIG. 3A, in order to enable the conference tables 220-1 and 220-7 at both ends to be opposite to each other, conference table 220-3 can be inserted between conference table 220-1 and conference table 220-5. The unit angle between adjacent conference tables 220 changes accordingly. For example, the angle between conference table 220-1 and conference table 220-7 changes from unit angle α (90°) to unit angle β (45°. Therefore, the adjusted desktop area still has a semi-circular shape.

Alternatively, or in addition, conference table 220-3 can also be inserted between conference table 220-5 and conference table 220-7. Likewise, conference table 220-1 and conference table 220-7 remain opposite in the inserted desktop area.

For example, in the first conference layout, the long side of conference table 220-5 can be parallel to the plane of the sharing window, and the connection between the center point of conference table 220-5 and the reference position as a reference line can be perpendicular to the sharing window. Conference table 220-1 and conference table 220-7 are respectively arranged on both sides of the reference line. In the second conference layout after adding conference table 220-3, the connection between the intersection 301 of conference tables 220-3 and 220-5 and the reference position can serve as a reference line and be perpendicular to the sharing window. Conference table 220-1 and conference table 220-3 are distributed on one side of the reference line, and conference table 220-5 and conference table 220-7 are distributed on the other side. Whether before or after adding conference table 220-3, each participant is enabled to have a relatively good view to watch the audio-visual content in the sharing window.

In some embodiments, if the number of participants is an even number, the computing device 120 symmetrically sets a plurality of conference positions corresponding to the number based on the orientation of the reference position and the sharing window for content sharing. For example, the computing device 120 symmetrically sets an even number of conference positions on both sides of the plane perpendicular to the orientation of the sharing window (the reference position is located on the plane). For example, the even number of conference positions can be set as a row of conference positions parallel to the sharing window at the reference position.

FIG. 3B shows a schematic diagram of dynamically adjusting an even number of conference tables according to some embodiments of the present disclosure. As shown in FIG. 3B, for example, the desktop area presented by the first conference layout includes an even number (four) of conference tables 220. For example, adjacent conference tables 220-1, 220-3, 220-5, and 220-7 are arranged. Conference table 220-1 is arranged opposite to conference table 220-7, and conference table 220-3 and 220-5 are located between conference table 220-1 and 220-7. The desktop area formed by these four conference tables has a semi-circular shape. The unit angle between conference table 220-1 and 220-3, the unit angle between conference table 220-3 and 220-5, and the unit angle between conference table 220-5 and 220-7 are all β (45°).

For example, when the participant 300-3 as a participating party enters the scene for the virtual conference in discussion mode, the computing device 120 adds a conference table 220-4 in scene 153 for the virtual conference in discussion mode, so as to provide a conference table for the participants 300-3. For example, as shown in FIG. 3B, in order to keep the conference table 220-1 and conference table 220-7 at both ends always to be opposite, conference table 220-4 can be inserted between conference table 220-3 and conference table 220-5. In the second conference layout after insertion of conference table 220-4, each of the angles between adjacent conference tables 220 from conference tables 220-1, 220-3, 220-4, 220-5 and 220-7 is the unit angle. The unit angle=180°/(the number of participants−MOD (the number of participants, 2)), and MOD is modulo. In this embodiment, the unit angle β (45°) remains unchanged. Therefore, the adjusted desktop area still has a semicircular shape.

In some embodiments, the change in the number of participants indicates the addition of the first participant, and the central conference position is set to correspond to the first participant. Specifically, after the first participant joins, the number of participants is odd. Accordingly, the conference position is added for the first participant, and this conference position may be a central conference position.

In the example of FIG. 3B, in the first conference layout, the connection between the intersection 301 of conference table 220-3 and conference table 220-5 and the reference position, as the reference line, is perpendicular to the sharing window 210. Conference table 220-1 and conference table 220-3 are distributed on one side of the reference line, and conference table 220-5 and conference table 220-7 are distributed on the other side. When participant 300-3 joins the conference, conference table 220-4 is added for participant 300-3. Conference table 220-4 can be used as the central conference position. The long side of conference table 220-4 can be parallel to the sharing window, and the connection between the center point of conference table 220-4 and the reference position, as the reference line, can be perpendicular to the sharing window. Whether before or after adding conference table 220-4, each participant is enabled to have a relatively good view to watch the audio-visual content in the sharing window.

Based on the above discussion, the computing device 120 presents the second conference layout for the virtual conference in discussion mode in the scene 153 for the virtual conference in discussion mode. The computing device 120 renders a desktop area for the virtual conference based on the second conference layout. For example, the rendered new desktop area has a smooth semi-circular shape.

In embodiments of the present disclosure, it is possible to adjust the conference tables and/or the number of seats in a virtual conference in discussion mode with the dynamic changes in the number of participants. With the adjustment of the number of conference tables and/or seats, the layout of the conference tables and/or seats can be further adjusted in conjunction with the reference position for content sharing. It can lower the communication barriers to participants, reduce the production cost of the conference layout, simplify the operation of modifying the conference layout, and enhance user experience.

Scene 2

In some embodiments, the computing device 120 constructs a scene 155 for a virtual conference in a face-to-face mode for a plurality of users, so that the plurality of virtual avatars of the users can have face-to-face discussions in the same virtual space, i.e., the scene 155 for the virtual conference in face-to-face mode.

As an example, as shown in FIG. 1, the computing devices 120-1 and 120-2 can communicate wirelessly to construct a common the scene 155 for the virtual conference in face-to-face mode for users 130-1 and 130-2, so that the virtual avatars of users 130-1 and 130-2 are in the scene 155 for the virtual conference in the face-to-face mode.

In the scene 155 for the virtual conference in the face-to-face mode, the number of users participating in the conference will change in real time as the conference theme or activity theme changes. Alternatively, during the conference, the number of users participating in the conference will also change. In these cases, when the number of users participating in the conference changes, the computing device 120 needs to adjust the conference layout to adapt to the current number of the users participating in the conference. On the other hand, in the same conference, the users participating in the conference may adjust their positions at any time. Therefore, when the position of users participating in the conference changes, the computing device 120 needs to adjust the conference layout.

In some embodiments, in the scene 155 for the virtual conference in face-to-face mode, the computing device 120 adjusts the first conference layout to the second conference layout based on the number of participating positions and the number of participants in the virtual conference and. For example, participants may be virtual avatars of the users.

Figure 4A:
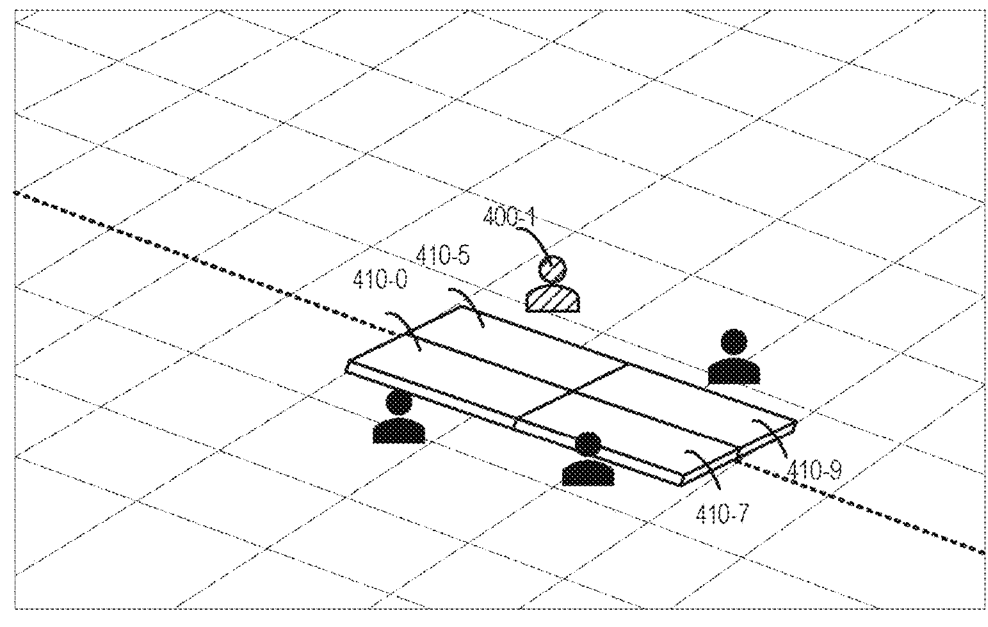
FIG. 4A shows a schematic diagram of a conference layout in a virtual conference in face-to-face mode according to some embodiments of the present disclosure.
Figure 4B:
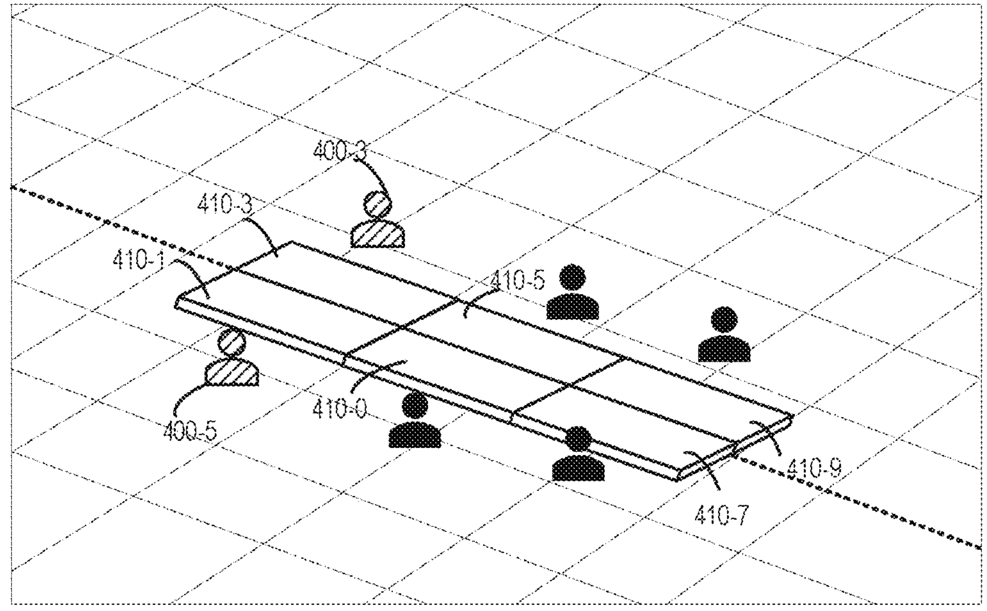
FIG. 4B shows a schematic diagram of a conference layout in a virtual conference in face-to-face mode according to other embodiments of the present disclosure.

The solutions for dynamically adjusting the number and layout of participating positions when the number of participants changes will be further explained in conjunction with FIGS. 4A and 4B.

FIG. 4A shows a schematic diagram of the layout of the virtual conference in face-to-face mode according to some embodiments of the present disclosure. In order to facilitate the discussion of the participants, the computing device 120 typically sets one or more pairs of face-to-face conference positions. For example, the conference positions can be conference tables and/or seats.

For example, as shown in FIG. 4A, in the first conference layout, two rows of conference positions are arranged face-to-face. For ease of description, the conference positions are collectively referred to as or individually referred to as conference positions 410. For example, conference positions 410-0 and 410-5 are arranged face-to-face, and conference positions 410-7 and 410-9 are placed face-to-face. Among them, conference positions 410-5 are idle.

In some embodiments, in response to determining the number of participants and the number of participating positions of the first conference layout does not match, the computing device 120 adds at least one participating position in the scene 155 for the virtual conference in face-to-face mode to form a second conference layout.

For example, as shown in FIG. 4A, if the number of participants changes midway through the conference (e.g., participants 400-1 joins), the computing device 120 adds a participating position, such as a participating position 410-5, for the participant 400-1.

In some embodiments, in response to determining the number of participants in the first conference layout does not match the number of participants, the computing device 120 increases or decreases the number of participants in pair in the scene 155 for the virtual conference in face-to-face mode to form a second conference layout.

FIG. 4B shows a schematic diagram of the conference layout in a virtual conference in face-to-face mode according to other embodiments of the present disclosure. For example, as shown in FIG. 4B, if the number of participants changes in the middle of the conference (e.g., participants 400-3 and 400-5 join in pair, or only one of participants 400-3 or 400-5 joins), since the first conference layout lacks participating positions of participants 400-3 and/or 400-5, the computing device 120 adds the participating positions in pairs in the scene 155 for the virtual conference in face-to-face mode, for example, the participating positions 410-1 and 410-3, which are placed face to face.

Alternatively, or in addition, as shown in FIG. 4B, a conference position 410-1 is added at a blank position on the side away from the conference position 410-7 and close to the conference position 410-0. At the same time, a conference position 410-3 is added at a blank position away from the conference position 410-9 and close to the conference position 410-5.

Alternatively, or in addition, a participating position 410-1 is added at a blank position on one side away from the participating position 410-0 and close to the participating position 410-7. At the same time, a participating position 410-3 is added at a blank position away from the participating position 410-5 and close to the participating position 410-9.

Based on the above discussion, the computing device 120 presents the second conference layout of the virtual conference in face-to-face mode in the scene 155 of the virtual conference in face-to-face mode. If the conference position 410 is a conference table, the computing device 120 renders a desktop area for the virtual conference based on the second conference layout. For example, the rendered new desktop area has a rectangular shape that extends in a predetermined direction.

In embodiments of the present disclosure, it is possible to adjust the number of the participating positions of the virtual conference in face-to-face mode with the dynamic changes in the number of participants. Further, depending on whether the first conference layout matches the number of participants, the number of participating positions is increased or decreased. It can lower the communication obstacles of the participants, reduce the production cost of the conference layout, simplify the operation of modifying the conference layout, and enhance the user experience.

Scene 3

In some embodiments, the computing device 120 constructs scene 157 for a virtual conference in speech mode for a plurality of users, so that the plurality of virtual avatars of users participate in the same speech activity in the same virtual space, i.e., the scene 157 for the virtual conference in speech mode.

As an example, as shown in FIG. 1, the computing devices 120-1 and 120-2 may communicate wirelessly to construct a scene 157 of a virtual conference in a common speech mode for user 130-1 and user 130-2, such that the virtual avatars of user 130-1 and user 130-2 are in a scene 157 for a virtual conference in speech mode.

Figure 5:
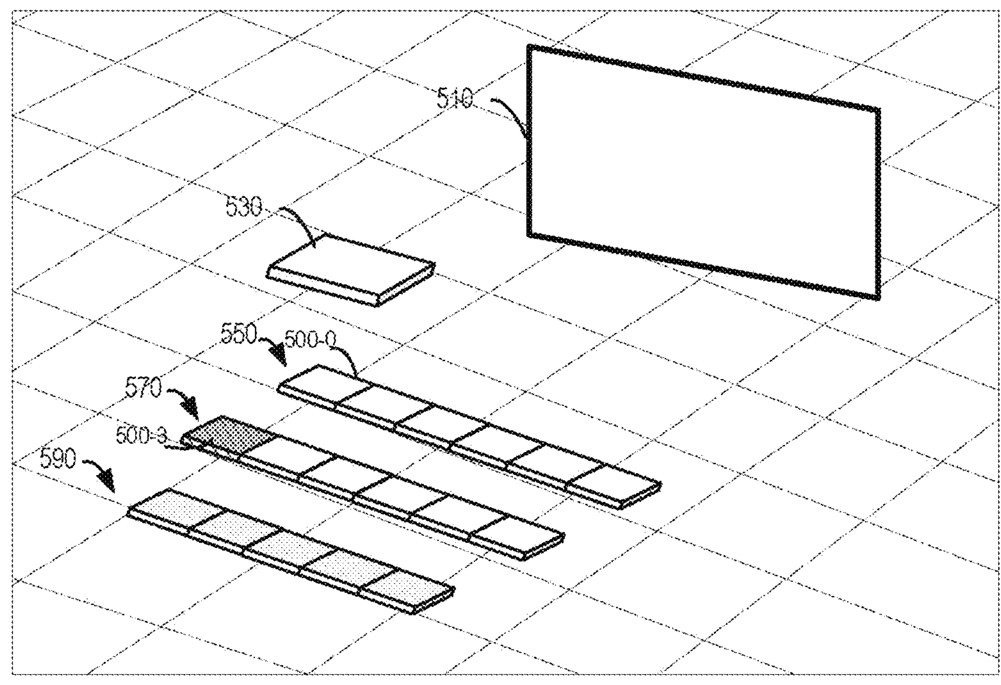
FIG. 5 shows a schematic view of a conference layout in a virtual conference of the speech mode according to some embodiments of the present disclosure.

FIG. 5 illustrates a schematic diagram of a conference layout in a virtual conference in speech mode according to some embodiments of the present disclosure. For example, as shown in FIG. 5, the computing device 120 presents the conference layout of the virtual conference in speech mode in a scene 157 for the virtual conference in speech mode. For example, the computing device 120 presents a sharing window 510, a speaker position 530, and at least one set of audience positions organized in groups. For ease of description, audience positions are collectively or individually referred to as audience positions 500. In such way, the plurality of audience positions are organized in straight rows, straight columns, arcuate rows, arcuate columns, or other patterns of groups.

In some embodiments, the sharing window 510 may be used for content sharing. For example, the sharing window 510 may present audiovisual content, for example, provided by the computing device 120. The speaker position 530 is located at a separate position in front of the sharing window 510. In a blank area in front of the sharing window 510 and at an appropriate distance from the speaker position 530, one or more sets of audience positions 500 can be arranged.

For example, a group of audience positions 500 organized in rows can be parallel to the plane of the sharing window 510, so that participants located at the audience position 500 have a better view to view the sharing window 510.

In some embodiments, in the scene 157 for the virtual conference in speech mode, the computing device 120 can adjust the first conference layout to the second conference layout based on the number of participants in the virtual conference. For example, the speech mode includes a speaker position and at least one row of audience positions organized in rows. For example, the participants can be virtual avatars of users. For example, the audience positions can be conference tables and/or seats. The following is further explained in conjunction with FIG. 5 to dynamically adjust the number and layout of audience positions when the number of participants changes.

In some embodiments, according to the number of participants in the virtual conference, the computing device 120 increases or decreases at least one audience position in at least one set of audience positions in the scene 157 for the virtual conference in speech mode.

For example, the number of participants may change midway through the conference, for example, increasing or decreasing one participant. Taking increasing one participant as an example, as shown in FIG. 5, in the first conference layout, a plurality of audience positions 500 are organized into two parallel rows: a first row of audience positions 550 and a second row of audience positions 570. Compared to the first row of audience positions 550, the second row of audience positions 570 do not include an audience position 500 at the end. In response to a participant joining midway through the conference, the computing device 120 adds an audience position in the scene 157 for the virtual conference in the speech mode and determines the placement position of the audience position. For example, the audience position 500-3 is placed at the end of the second row of audience positions 570, corresponding to the audience position 500-0 at the end of the first row of audience positions 550. The conference layout after adding the audience position 500-3 becomes the second conference layout.

Alternatively, or in addition, according to the number of participants in the virtual conference, the computing device 120 increases or decreases the audience position in groups in the scene 157 for the virtual conference in the speech mode.

For example, as shown in FIG. 5, the number of participants may change midway through the conference, for example, increasing or decreasing a plurality of participants. Taking increasing a plurality of participants as an example, as shown in FIG. 5, in the first conference layout, a plurality of audience positions 500 are organized into two parallel rows: a first row of audience positions 550 and a second row of audience positions 570. The numbers of audience positions in the first row of audience positions 550 and the second row of audience positions 570 are the same and the two rows are aligned. In response to increasing a plurality of (e.g., 5) participants midway through the conference, the computing device 120 adds a plurality of (5) audience positions in the scene 157 for the virtual conference in speech mode and determines the placement position of the audience positions. For example, the plurality of (5) audience positions are organized in a row which is referred to as a third row of audience positions 590 for ease of description. For example, the third row of audience positions 590 can be placed parallel to the first row of audience positions 550 and the second row of audience positions 570. The conference layout after adding the third row of audience positions 590 is the second conference layout.

It will be appreciated that a plurality sets of audience positions can be added according to the additional participants, and scope of the present disclosure is not particularly limited herein.

Based on the above discussion, the computing device 120 presents the second conference layout for the virtual conference in speech mode. If the conference position 410 is a conference table, the computing device 120 renders a desktop area for the virtual conference based on the second conference layout. For example, the rendered new desktop area is in the form of at least one row of rectangles extending in a predetermined direction.

In embodiments of the present disclosure, it is possible to adjust the number of audience positions of the virtual conference of the speech mode with the dynamic changes in the number of participants. Further, by increasing or decreasing at least one set of audience positions, or by increasing or decreasing audience positions in groups, the first conference layout is adjusted to the second conference layout. It can lower communication obstacles for participants, reduce the production cost of the conference layout, simplify the operation of modifying the conference layout, and enhance user experience.

Scene 4

In some embodiments, the user may enter the scene from a virtual conference to another virtual conference scene, the computing device 120 switches the virtual conference scene for the user, so that the user wearing the XR device displays the current virtual conference scene is switched to the next virtual conference scene.

As an example, the user 130-1 enters the scene 155 for the virtual conference in the face-to-face mode from the scene 153 for the virtual conference in discussion mode, and the computing device 120-1 reconstructs the scene 155 for the virtual conference in the face-to-face mode to display the scene 155 for the virtual conference in face-to-face mode on the XR device 110-1.

In some embodiments, the computing device 120 adjusts the first conference layout to the second conference layout based on the changed conference mode and the number of participants in the virtual conference. For example, when the conference mode is switched among the discussion mode, face-to-face mode and speech mode, different conference modes correspond to different conference layouts. The conference layout of the conference mode before switching is the first conference layout. The computing device 120 can determine the conference layout of the switched conference mode and further adjust the conference layout of the switched conference mode according to the change in the number of participants to form the second conference layout. In addition, the computing device 120 can also adjust the conference layout of the conference mode before switching according to the change in the number of participants.

For example, after one or more participants enter the virtual conference from the discussion mode to the face-to-face mode, the computing device 120 determines the current conference layout corresponding to the face-to-face mode and adjusts the current conference layout corresponding to the face-to-face mode according to the newly joined one or more participants. Accordingly, before one or more participants enter the virtual conference from the discussion mode to the face-to-face mode, the computing device 120 determines the current conference layout corresponding to the discussion mode and adjusts the current conference layout corresponding to the discussion mode to the new conference layout according to the reduced one or more participants.

In embodiments of the present disclosure, the first conference layout can be adjusted to the second conference layout based on the changed conference mode and the number of participants in the virtual conference. It can lower communication barriers among participants, reduce the production cost of the conference layout, simplify the operation of modifying the conference layout, and enhance user experience.

It should be understood that the specific numbers and presentation styles involved in the conference layout described in the above example scenes in conjunction with the accompanying drawings are only for illustration and are not intended to limit the present disclosure.

Figure 6:
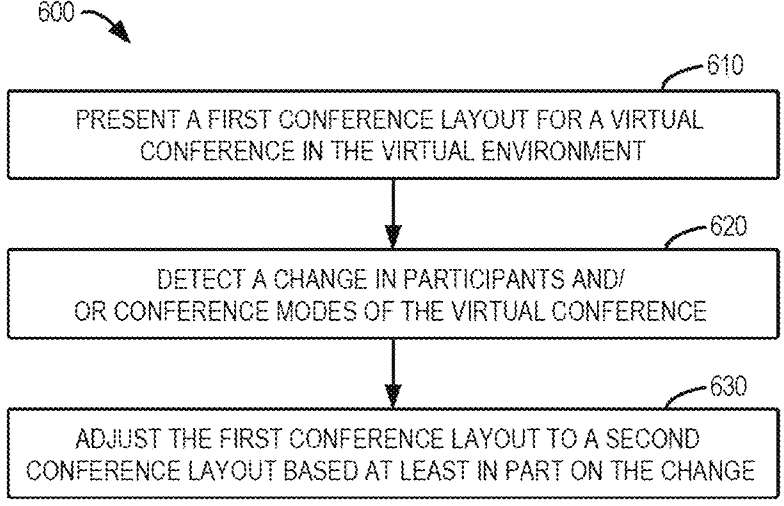
FIG. 6 shows a flowchart of a process of a method for interaction in a virtual environment according to some embodiments of the present disclosure.

FIG. 6 shows a flowchart of a process 600 for interactive virtual environment according to some embodiments of the present disclosure. Process 600 may be performed, for example, by the computing device 120 shown in FIG.

In block 610, the computing device 120 presents a first conference layout for virtual conferences in a virtual environment.

In block 620, the computing device 120 detects a change in the participants and/or conference mode of the virtual conference.

In block 630, the computing device 120 adjusts the first conference layout to the second conference layout base at least in part on change.

In some embodiments, the change comprises a change in a number of the participants.

In some embodiments, adjusting to the second conference layout comprises: in response to the conference mode of the virtual conference being a discussion mode, adjusting conference layout to the second conference layout based on a reference position for content sharing in the discussion mode and a number of the participants in the virtual conference.

In some embodiments, determining the second conference layout based on the number comprises: in response to an odd number, the computing device 120 sets a central conference position at a target position relative to the reference position and symmetrically sets a plurality of further conference positions based on the reference position and the target position.

In some embodiments, the change in the number of the participants indicates joining of a first participant, and the central conference position is set to be corresponding to the first participant.

In some embodiments, determining the second conference layout based on the number comprises: in response to an even number, the computing device 120 symmetrically sets a plurality of further conference positions corresponding to the number based on the reference position and an orientation of a sharing window for content sharing.

In some embodiments, in response to the conference mode of the virtual conference being a face-to-face mode; and a number of participating positions in the first conference layout mismatching a number of participating parties, the computing device 120 increases or decreases at least one participating position.

In some embodiments, increasing or decreasing at least one participating position comprises: the computing device 120 increases or decreases the participating position in pair.

In some embodiments, in response to the conference mode of the virtual conference being a speech mode, the speech mode comprising a speaker position and at least one set of audience positions organized in groups; and according to the number of participants in the virtual conference, the computing device 120 increases or decreases at least one audience position in at least one group of audience positions; or increases or decreases the audience positions in groups.

In some embodiments, the change comprises a change in conference mode, and adjusting to the second conference layout comprises: the computing device 120 determines the second conference layout based on the changed conference mode and a number of participants in the virtual conference.

In some embodiments, the computing device 120 renders a desktop area for the virtual conference based on the second conference layout.

Figure 7:
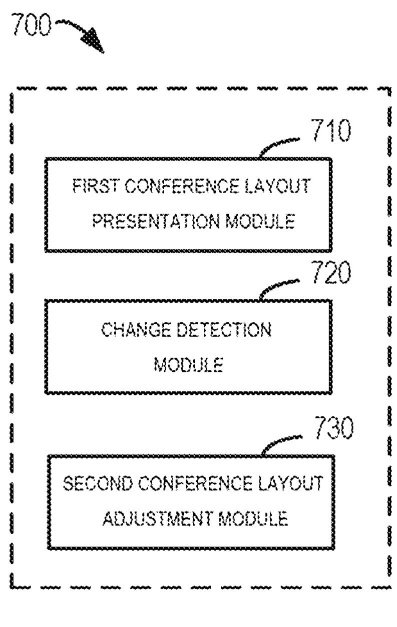
FIG. 7 shows a block diagram of an apparatus for interaction in a virtual environment according to some embodiments of the present disclosure.

FIG. 7 shows a schematic block diagram of an apparatus 700 for interaction in a virtual environment according to embodiments of the present disclosure. The various modules/components in apparatus 700 may be implemented by hardware, software, firmware, or any combination thereof.

As shown, the apparatus 700 includes a first conference layout presentation module 710 configured to present a first conference layout for a virtual conference in the virtual environment. The apparatus 700 also includes a change detection module 720 configured to detect a change in participants and/or conference modes of the virtual conference. The apparatus 700 also includes a second conference layout adjustment module 730 configured to adjust the first conference layout to a second conference layout based at least in part on the change.

In some embodiments, the change comprises a change in a number of the participants.

In some embodiments, the second conference layout adjustment module 730 comprises: in response to the conference mode of the virtual conference being a discussion mode, adjusting conference layout to the second conference layout based on a reference position for content sharing in the discussion mode and a number of the participants in the virtual conference.

In some embodiments, the second conference layout determination module is further configured to, in response to an odd number, set a central conference position at a target position relative to the reference position, and symmetrically set a plurality of further conference positions based on the reference position and the target position.

In some embodiments, the change in the number of the participants indicates joining of a first participant, and the central conference position is set to be corresponding to the first participant.

In some embodiments, the second conference layout determination module is further configured to, in response to an even number, symmetrically set a plurality of further conference positions corresponding to the number based on the reference position and an orientation of a sharing window for content sharing.

In some embodiments, the apparatus 700 further comprising: a face-to-face mode determination module configured to in response to the conference mode of the virtual conference being a face-to-face mode and a number of participating positions in the first conference layout mismatching a number of participating parties, increase or decrease at least one participating position.

In some embodiments, the apparatus 700 further comprises a participating position adjustment module configured to increase or decrease the participating position in pair.

In some embodiments, the apparatus 700 further comprises a speech mode determination module configured to in response to the conference mode of the virtual conference being a speech mode, the speech mode comprising a speaker position and at least one set of audience positions organized in groups; and a third participating position adjustment module configured to, according to the number of participants in the virtual conference, increase or decrease at least one audience position in at least one group of audience positions; or increase or decrease the audience positions in groups.

In some embodiments, the change comprises a change in conference mode, the second conference layout adjustment module 730 is further configured to determine the second conference layout based on the changed conference mode and a number of participants in the virtual conference.

In some embodiments, the apparatus 700 further comprises a desktop area rendering module configured to render a desktop area for the virtual conference based on the second conference layout.

In some XR scenes, virtual screens can be set at predetermined positions so that a plurality of users in the XR scene can view the virtual screen at the same time. However, in the XR scene, the virtual avatar corresponding to each user is in a different position in the virtual environment, which makes different users have different perspectives on the virtual environment, resulting in significant differences in the perception of the virtual screen by different users. For example, some virtual avatars may be far away from the virtual screen, making it difficult to see the content in the virtual screen clearly. Some virtual avatars may have large angles relative to the virtual screen. This may cause the content seen by the users to be significantly distorted, affecting the viewing experience.

Embodiments of the present disclosure proposes solutions for interaction in virtual environment. According to various embodiments of the present disclosure, a reference position associated with a user's virtual avatar in the virtual environment is determined. A window specific to the user's virtual avatar is presented at a target position in the virtual environment, the window displaying shared content in the virtual environment, an orientation and/or a size of the window in the virtual environment being determined based on the reference position.

In this disclosure, "shared content" includes content visible to a plurality of participants in the virtual environment. In the virtual environment, part of the displayed content is visible to all participants in the virtual environment, and such part of the displayed content can be considered to be presented in the "public domain" of the virtual environment. On the contrary, part of the displayed content is only visible to a participant in the virtual environment, and such part of the displayed content can be considered to be presented in the "private domain" specific to that participant in the virtual environment. Therefore, "shared content" should usually be presented in the "public domain". However, due to the uniformity of the display style in the "public domain", there is a problem of different perspectives and perceptual differences, as discussed earlier. Embodiments of the present disclosure can adjust the window of the "shared content" to the "private domain" for presentation and adaptively change the display size and/or orientation of the window, while ensuring synchronization of the "shared content".

In this manner, embodiments of the present disclosure determine the orientation and/or size of the window for displaying shared content based on the reference position associated with the user's virtual avatar, which is specific to the user and is presented at the target position in the virtual environment.

In this way, when each user involved in an event that occurs in a virtual environment watches shared content facing the same target position, although each user is at a different reference position, the window presented in front of each user not only displays the same shared content, but also dynamically adjusts the orientation and/or size of the window displaying shared content for a plurality of users at different reference positions in the virtual environment to be specific to each user. This solution can make a plurality of users view shared content facing the same target position in a consistent way, improving user experience.

The following embodiments of the present disclosure will be described in conjunction with the accompanying drawings. It will be understood from the following description, according to embodiments of the present disclosure, provides a user with a program for interaction in a virtual environment.

Figure 8:
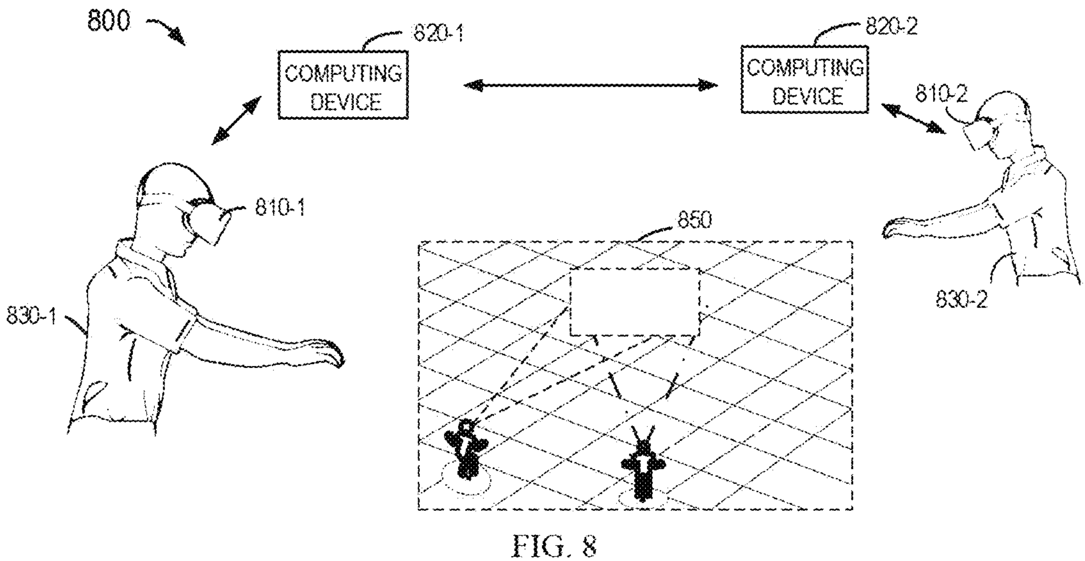
FIG. 8 shows a schematic diagram of an example environment in which embodiments of the present disclosure can be implemented.

FIG. 8 shows a schematic diagram of an example environment 800 in which embodiments of the present disclosure can be implemented. The XR device has a plurality of users in the example environment 800, such as user 830-1 and user 830-2 (collectively or individually referred to as user 830). As shown in FIG. 8, user 830 can wear an XR device, such as the XR devices 810-1 and 810-2 (collectively or individually referred to as XR device 810).

Computing device 820-1 and computing device 820-2 (collectively or individually referred to as computing device 820) can respectively construct virtual scenes for user 830-1 and user 830-2 or merge virtual content with real scenes. For example, the XR device 810-1 communicates with computing device 820-1 to rebuild virtual scenes for user 830-1 or merge virtual content with real scenes; the XR device 810-2 communicates with computing device 820-2 to rebuild virtual scenes for user 830-2 or merge virtual content with real scenes.

In some embodiments, computing device 820-1 and computing device 820-2 may communicate wirelessly to build a common virtual scene for user 830-1 and user 830-2, without limiting the plurality of users must be in the same physical space. In the present disclosure, virtual scenes reconstructed based on VR technology, and scenes where virtual content and real scenes are fused based on AR technology or MR technology are collectively referred to as virtual scenes 850.

A virtual conference can refer to a conference organized in an XR-based virtual environment. In such a virtual conference, participants (also known as attendees) can interact with virtual avatars of other participants, such as in an immersive XR scene, to achieve the effect of a face-to-face conference. It should be understood that the virtual scene 850 as shown is only illustration and is not intended to limit the scope of the present disclosure.

The XR device 810 can be a head-mounted or wearable near-eye display device, such as Head Mounted Display, smart glasses, etc., supporting technologies such as VR, AR, MR, etc. The XR device 810 can include image generation components and optical display components for reconstructing virtual scenes 850 in a monocular or binocular field of view and displaying virtual objects. Virtual objects can include three-dimensional virtual objects and/or two-dimensional virtual objects. Two-dimensional virtual objects can include two-dimensional windows without thickness for presenting various contents in virtual scenes 850 similar to electronic screens. For example, two-dimensional virtual objects can include shared screens for displaying content that needs to be shared in virtual conferences. Three-dimensional virtual objects can include various virtual avatars corresponding to users. For example, The XR device 810 can draw corresponding virtual avatars for users 830 (e.g., users 830-1 and 830-2) participating in virtual conferences in virtual scenes 850, which can be three-dimensional virtual objects. Three-dimensional virtual objects can also include various objects, such as tables, chairs, and so on, required in virtual conferences.

It can be understood that the virtual avatar corresponding to user 830 can move correspondingly in the virtual environment 850 in response to user 830's movement in the physical world and/or interaction with the XR device 810. For example, the virtual avatar can enter and exit different modes of virtual conference scenes, or move in the same virtual conference scene. In the virtual conference scene, the virtual avatar can move to a fixed position or move between different positions. User 830 can also adjust the posture, actions, etc. of the corresponding virtual avatar through the XR device 810.

It should be understood that the structure and function of the environment 800 are described for illustrative purposes only and are not intended to imply any limitation as to the scope of the present disclosure. The XR device 810 may include any suitable structure and function to implement interaction with the XR scene. Example solutions according to embodiments of the present disclosure will be described in detail below in conjunction with the accompanying drawings.

Figure 9:
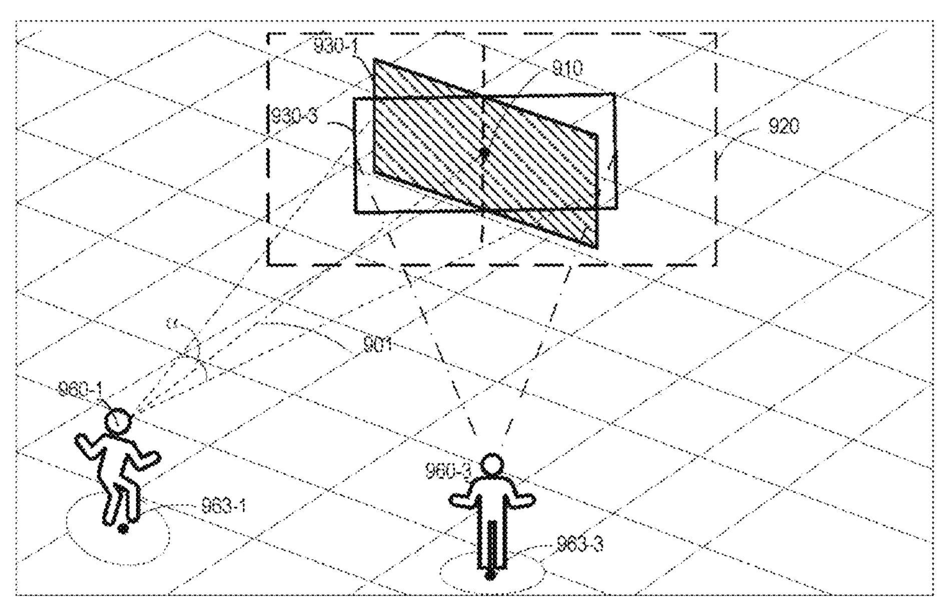
FIG. 9 shows a schematic diagram of a virtual environment according to some embodiments of the present disclosure.

FIG. 9 shows a schematic diagram of a virtual environment 900 according to some embodiments of the present disclosure. For example, the virtual environment 900 may be constructed by computing device 920 discussed in FIG.

In virtual environment 900, the XR device 810 can present a plurality of virtual avatars corresponding to users. As shown in FIG. 9, user 830-1 can correspond to virtual avatar 960-1, and user 830-2 can correspond to virtual avatar 960-3.

Further, the XR device 810 determines a reference position of the virtual avatar in the virtual environment. In some embodiments, the "reference position" may represent an appropriate position associated with the virtual avatar. For example, the reference position may include a real-time position of the virtual avatar in the virtual environment, such as the position of the virtual center of gravity of the virtual avatar or a virtual viewpoint position. Alternatively, the reference position may also include a pre-assigned position of the virtual avatar in the virtual environment, such as the position of a virtual seat assigned to the virtual avatar in a virtual conference.

For example, the XR device 810 determines the real-time position of the virtual avatar in the virtual environment as a reference position. For example, when the user's virtual avatar moves in the virtual environment, the XR device 810 detects the position change of the virtual body in real time to determine the reference position corresponding to the virtual body.

Alternatively, or in addition, the XR device 810 may determine a predetermined position for the virtual avatar based on events occurring in the virtual environment. For example, if the event occurring in the virtual environment is a virtual conference, the XR device 810 determines that the predetermined position for the virtual avatar is a position pre-allocated to the user in the virtual conference. For example, in a virtual conference in discussion mode, the virtual avatar may be assigned to one of a plurality of predetermined positions distributed around the roundtable.

For example, as shown in FIG. 9, the virtual avatar 960-1 may be located at a position 963-1 in the virtual environment, the virtual avatar 960-3 may be located at a position 963-3 in the virtual environment. In some embodiments, the position 963-1 and the position 963-3 may be a virtual conference pre-allocated position for the user.

The XR device 810 can draw a display space visible to a plurality of users in the virtual environment 900. Such a display space is also called the public display domain, also known as the "public domain". The content in the public display domain is visible to all users in the virtual environment. In the example of FIG. 9, the virtual avatar 960-1 of user 830-1 and the virtual avatar 960-3 of user 830-2 can view shared content facing the public display domain 920. When a plurality of users jointly view shared content facing the public display domain, these users can observe each other. For example, when user A views shared content facing the public display domain, it can be observed that user B is also viewing shared content facing the public display domain. Therefore, the public display domain designed in this way improves the sense of participation and immersion of a plurality of users in the virtual environment and enhances the user experience.

In some embodiments, the XR device 810 can design a plurality of sharing windows that can be presented in a common display domain that is visible to the user in the virtual environment 900. The sharing window can be designed to present shared content. The position of the sharing window can be determined as a target position in the common display domain. For example, the target position can be the position of a virtual screen reserved in the virtual conference scene. The same virtual screen (also known as "common screen") that a plurality of users (e.g., user 830-1, user 830-2) can view is placed at the target position in the virtual environment 900. The shared content is displayed on the common screen, and the actions taken by the user for the shared content (editing operations, identification operations, etc.) are displayed synchronously.

Considering that the visual avatars of different users are located at different reference positions in the virtual environment 900, when viewing the same shared content towards the target position, due to the different viewing angles of users, there are differences in the perception of different perspectives. The present disclosure proposes that when users view shared content in the direction of the public display domain at the corresponding reference position, the display space of the shared content presented specifically to the user in the public display domain is called the "private domain". Accordingly, the viewing angle of the user when viewing the shared content towards the "private domain" at the corresponding reference position is called the "private domain perspective". Therefore, in this disclosure, the XR device 810 separately renders a "window" for each user to display the same shared content in the virtual environment 900. The XR device 810 presents a window specific to the user's virtual avatar, that is, the window is displayed in the user's "private domain" instead of being presented in the "public domain".

In the example of FIG. 9, the XR device 810 renders window 930-1 viewed in the "private domain" for user 830-1. The XR device 810 renders window 930-3 viewed in the "private domain" for user 830-2. Such window 930-1 is invisible to user 930-2, and window 930-3 is invisible to user 830-1. Additionally, window 930-1 and window 930-3 can be used to display the same shared content and present synchronous changes based on related operations.

In this disclosure, a "window" presented in a private domain specific to the user (or virtual avatar) is also referred to as a "private domain window." In some embodiments, if a private domain window corresponding to a sharing window is presented to a user, the sharing window in the public domain will not be visible to the user. In some embodiments, the position of the private domain window in the virtual environment is determined based on the position of the sharing window designed to present shared content in the virtual environment.

For example, taking a virtual conference as an example, a sharing window for presenting shared content can be reserved in the public domain in the virtual scene. Accordingly, in the case of presenting shared content using the private domain window in the private domain, the private domain window can also be presented in the reserved position of the sharing window. It should be understood that such positions can include specific position points or display areas. For example, in the example of FIG. 9, the center points of window 930-1 and window 930-3 can coincide with the target position 910.

Further, the XR device 810 may determine the orientation and/or size of the corresponding private window displayed in the virtual environment 900 based on the reference position associated with the virtual avatar. Thus, embodiments of the present disclosure enable users in different reference positions in the virtual environment 900 to view the same shared content with a consistent visual experience, improving the user experience.

Taking the scene of virtual conference in virtual environment 900 as an example, the XR device 810 can determine the orientation and/or size of the private domain window seen by each user's virtual avatar at the target position for users in different reference positions.

In some embodiments, the XR device 810 may be based on the reference position of the user's virtual avatar with respect to the direction of the target position, to determine the orientation of the window in the virtual environment. For example, the XR device 810 based on the reference position of the virtual avatar 960-1 of the user 830-1 with respect to the direction of the target position 910, the orientation of the window 930-1 specific to the user 830-1 in the virtual environment 900 is determined.

As an example, the XR device 810 can determine the orientation of the window in the virtual conference scene based on the direction of the connection between the virtual viewpoint position corresponding to the virtual avatar and the target position, so that the orientation of the window (such as the normal direction of the flat window) is parallel to the direction of the connection. As another example, in the case of a flat window, the XR device 810 can also make the plane where the flat window is located perpendicular to the direction of the connection, thereby determining the orientation of the window.

In some embodiments, the XR device 810 may also cause the private window to have the same field of view as the user-specific window viewed by the corresponding user's virtual avatar. Additionally, as shown in FIG. 9, the XR device 810 may also enable the connection 901 between the virtual viewpoint position of the virtual avatar 960-1 of the user located at the reference position 963-1 and the target position 910 to evenly split the field of view a at which the user's virtual avatar 960-1 views window 930-1, thereby ensuring that the window 930-1 can be located within a field of view suitable for user viewing.

Based on the above discussion, based on the direction of the reference position of the user's virtual avatar relative to the target position, the orientation of the window in the virtual environment is determined, so that different users have a consistent viewing experience when watching shared content, and the user experience is improved.

In some embodiments, the XR device 810 may also determine the size of the window in the virtual environment based on the distance from the reference position to the target position.

For example, the size of the window viewed by the virtual avatar of the user at different reference positions is the same in the virtual environment to enhance the viewing experience. As shown in FIG. 9, the size of the window 930-1 viewed by the user's virtual avatar 960-1 and the window 930-3 viewed by the user's virtual avatar 960-3 are the same in the virtual environment 900.

In some embodiments, the XR device 810 may determine a first size of the window based on a predetermined range for field of view and shape information of the window. Further, the XR device 810 determines a second size of the window in the virtual environment based on the first size and the distance from the reference position to the target position, such that the second size is proportional to the distance from the reference position to the target position.

Specifically, the XR device 810 determines a first size of the window based on the predetermined range for field of view and the shape information of the window. For example, the first size can be the DMM size of the window (distance-independent millimeter), including the horizontal DMM size of the window and the vertical DMM size of the window.

For example, such a predetermined range for field of view may include a field of view suitable for user viewing, such as 30 degrees, 45 degrees, 60 degrees, etc. Additionally, the shape of the window 1000 may have a predetermined shape, such as a rectangle, a circle, and other appropriate window shapes.

Further, the XR device 810 may also be scaled based on a certain scaling factor of the first size, thereby determining a second size. In some embodiments, the scaling factor may be based on the distance from the user's virtual avatar viewing angle position and the target position is determined.

For example, the second size may include the horizontal physical size and vertical physical size of the window. The product of the horizontal DMM size of the window and the scaling factor determines the horizontal physical size of the window, and the product of the vertical DMM size and the scaling factor determines the vertical physical size of the window.

Therefore, the XR device 810 can determine the size of the user-specific window in the virtual environment based on the field of view occupied by the window and the distance between the reference position of the user's virtual avatar and the target position.

Figure 10:
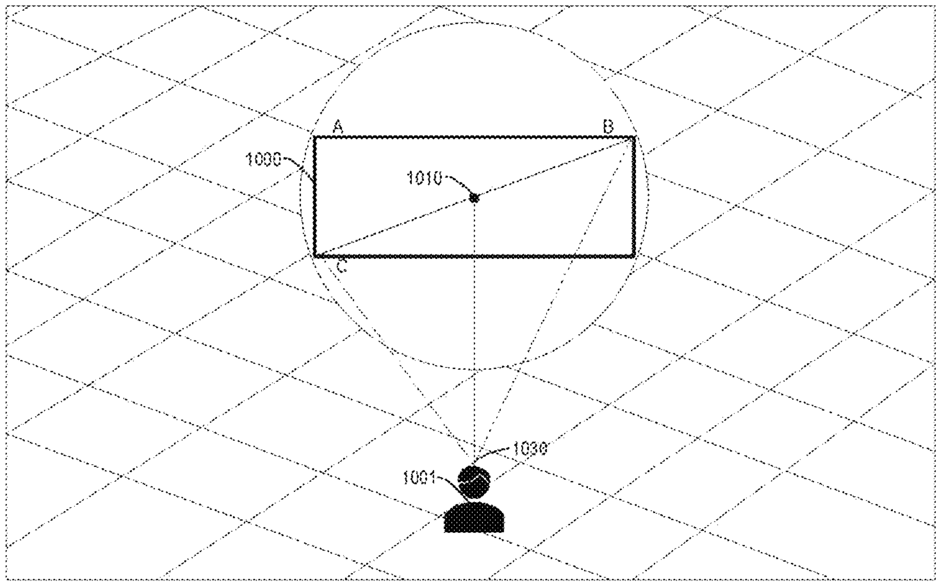
FIG. 10 shows a schematic view of the size of a user-specific window in a virtual environment according to some embodiments of the present disclosure.

FIG. 10 shows a schematic view of the size of a user-specific window in the virtual environment 900 according to some embodiments of the present disclosure. The size of the calculation window in the virtual environment 900 is described in detail below.

As shown in FIG. 10, the window 1000 specific to the user's virtual avatar 1001 may be rectangular in shape, for example.

Taking a rectangular window as an example, the XR device 810 can determine the DMM size of window 1000. First, the XR device 810 can determine the diagonal field of view of the rectangular window by:

$$Q = \sqrt{L^2 + P^2} \tag{1}$$

where Q represents the diagonal BC field of view range, L represents the transverse AB field of view range, and Q represents the longitudinal AC field of view range.

Furthermore, the XR device 810 can determine that the horizontal-vertical ratio of the sharing window is a:b, and the unit width d can be determined by:

$$\sqrt{(a \times d)^2 + (b \times d)^2} = \frac{\left(2 \times \tan\left(\frac{\left(\frac{Q}{2} \times \pi\right)}{180} \times 1\right)\right)}{0.001} \tag{2}$$

Further, the XR device 810 can determine the transverse DMM size and the longitudinal DMM size by:

$$X_{dmm} = a \times d \tag{3}$$

$$Y_{dmm} = b \times d \tag{4}$$

where $X_{dmm}$ represents the horizontal DMM size and $Y_{dmm}$ represents the vertical DMM size.

Additionally, the XR device 810 may determine the scaling factor according to the following formula:

$$\gamma = D / \alpha \tag{5}$$

where D represents the distance between the reference position 1030 and the target position 1010, where a is a constant greater than 0 (e.g., it may be "1" or other appropriate preset value).

Accordingly, the XR device 810 can determine the size of the window 1000 based on the horizontal DMM size and the vertical DMM size, as well as the scaling factor:

$$X = X_{dmm} \times \gamma \tag{6}$$

$$Y = Y_{dmm} \times \gamma \tag{7}$$

where X represents the horizontal size of the window, and Y represents the vertical size of the window.

As an example, the XR device 810 can share a content size ratio of 16:9, and the diagonal BC occupies a field of view of 30° (i.e., Q is equal to 30°) and the distance D between the reference position 1030 and the target position 1010 is 3 meters.

Accordingly, the XR device 810 can determine a unit width of 29.1922 based on the following formula:

$$\sqrt{(16 \times d)^2 + (9 \times d)^2} = \frac{\left(2 \times \tan\left(\frac{\left(\frac{30^\circ}{2} \times \pi\right)}{180} \times 1\right)\right)}{0001} \tag{8}$$

Furthermore, XR device 810 can determine that $X_{dmm}$=16*29.1922=467.08 and $Y_{dmm}$=9*29.1922=262.73 and determine γ=D/1=3/1=3.

Additionally, the XR device 810 may determine that X=$X_{dmm}$×γ=467.08*3=1401.24 mm and Y=$Y_{dmm}$×γ=262.73*3=788.19 mm.

Based on the above discussion, the size of the window in the virtual environment is determined based on the distance from the reference position of the user's virtual avatar to the target position, so that different users have the same size and consistent visual experience when watching shared content, which improves the user experience.

Figure 11:
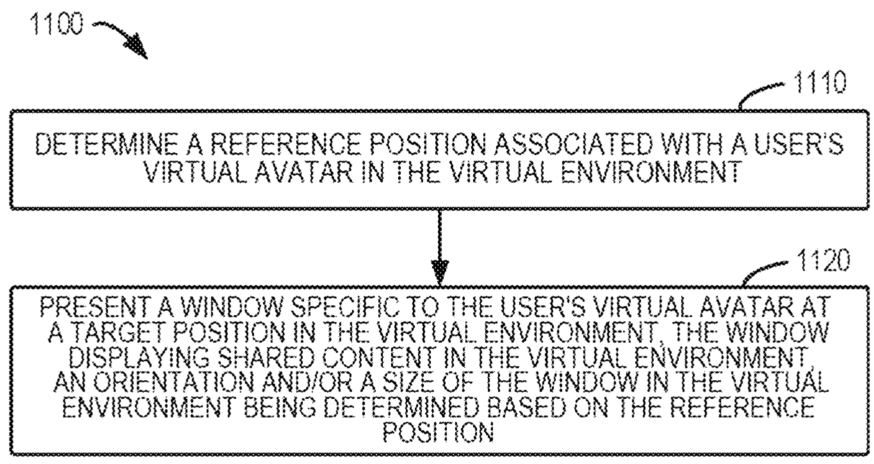
FIG. 11 shows a flowchart of a process for interaction in a virtual environment according to some embodiments of the present disclosure.

FIG. 11 shows a flowchart of a process 1100 for interaction in a virtual environment according to some embodiments of the present disclosure. Process 1100 may be performed, for example, by the computing device 820 shown in FIG. 8.

In block 1110, the XR device 810 determines a reference position associated with a user's virtual avatar in the virtual environment.

In block 1120, a user-specific virtual avatar window is presented at a target position in the virtual environment, where the window displays shared content in the virtual environment, an orientation and/or a size of the window in the virtual environment being determined based on the reference position.

In some embodiments, determining the reference position comprises: determining a real-time position of the virtual avatar in the virtual environment; or determining a predetermined position for the virtual avatar based on an event occurring in the virtual environment.

In some embodiments, the event comprises a virtual conference, and the predetermined position is a pre-assigned position for the user in the virtual conference.

In some embodiments, the process further comprises determining the orientation of the window in the virtual environment based on a direction of the reference position relative to the target position.

In some embodiments, the process further comprises determining the size of the window in the virtual environment based on a distance from the reference position to the target position.

In some embodiments, determining the size comprises: determining a first size of the window based on a predetermined range for field of view and shape information of the window; and determining a second size of the window in the virtual environment based on the first size and the distance, such that the second size is proportional to the distance.

In some embodiments, the window is a private window, the window is a private domain window, and a position of the private domain window in the virtual environment is determined based on a position of a sharing window designed to present the shared content in the virtual environment, and the sharing window is configured to be presented in a common display domain that is visible to a plurality of users in the virtual environment. While the private domain window is presented to the user, the sharing window is invisible to the user.

Figure 12:
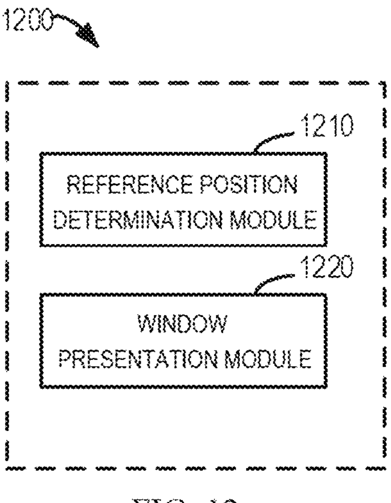
FIG. 12 shows a block diagram of an apparatus for interaction in a virtual environment according to some embodiments of the present disclosure.

FIG. 12 shows a schematic block diagram of apparatus 1200 for interaction in a virtual environment in accordance with certain embodiments of the present disclosure. The various modules/components in apparatus 1200 may be implemented by hardware, software, firmware, or any combination thereof.

As shown in the figure, the device 1200 includes a reference position determination module 1210 configured to determine a reference position associated with a user's virtual avatar in the virtual environment. The device 1200 also includes a window presentation module 1220 configured to present a window specific to the user's virtual avatar at a target position in the virtual environment, the window displaying shared content in the virtual environment, an orientation and/or a size of the window in the virtual environment being determined based on the reference position.

In some embodiments, the reference position determination module 1210 is further configured to determine a real-time position of the virtual avatar in the virtual environment; or determine a predetermined position for the virtual avatar based on an event occurring in the virtual environment.

In some embodiments, the event comprises a virtual conference, and the predetermined position is a pre-assigned position for the user in the virtual conference.

In some embodiments, apparatus 1200 further comprises a window orientation determination module configured to determine the orientation of the window in the virtual environment based on a direction of the reference position relative to the target position.

In some embodiments, apparatus 1200 further comprises a window size determination module configured to determine the size of the window in the virtual environment based on a distance from the reference position to the target position.

In some embodiments, the window size determination module comprises: a first size determination module configured to determine a first size of the window based on a predetermined range for field of view and shape information of the window; and a second size determination module configured to determine a second size of the window in the virtual environment based on the first size and the distance, such that the second size is proportional to the distance.

In some embodiments, the window is a private domain window, and a position of the private domain window in the virtual environment is determined based on a position of a sharing window designed to present the shared content in the virtual environment, and the sharing window is configured to be presented in a common display domain that is visible to a plurality of users in the virtual environment. While the private domain window is presented to the user, the sharing window is invisible to the user.

In conventional XR displays and interactions, virtual objects are usually rendered and simply superimposed on real images. Currently, in multi-person content sharing scenes in XR environments, only one participant is usually allowed to share or display content (such as through screen casting) to other participants. If other participants want to share their content, they need to directly replace the content currently being shared. However, this will result in poor user experience and is not conducive to user information obtaining and display.

For the above and other potential problems, embodiments of the present disclosure provide a scheme for interacting in a virtual environment, which renders a virtual scene allowing content sharing and presents at least a first content sharing window and a second content sharing window in an overlapping style. The first depth of field from the first content sharing window to the current viewpoint is smaller than the second depth of field from the second content sharing window to the current viewpoint.

Described below with reference to the accompanying drawings example embodiments of the present disclosure.

Figure 13:
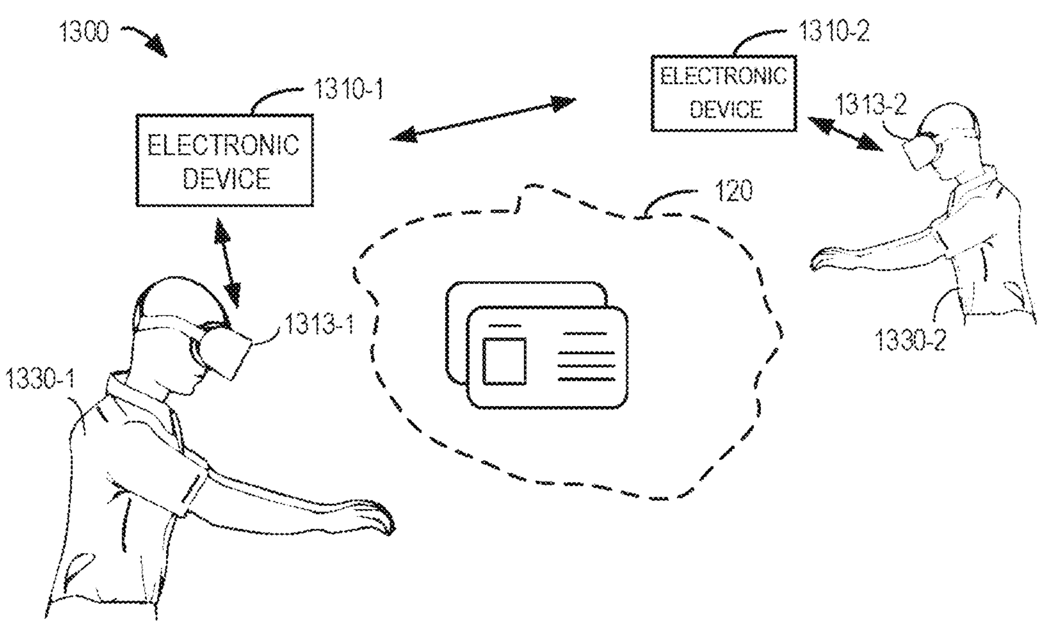
FIG. 13 shows a block diagram of an environment according to some embodiments of the present disclosure.

FIG. 13 shows a block diagram of the environment 1300 according to some embodiments of the present disclosure. As shown, there are a plurality of users, such as two users, in the environment 1300. The user 1330-1 wears the XR device 1313-1, and the user 1330-2 wears the XR device 1313-2. The XR device 1313-1 communicates with the electronic device 1310-1 to reconstruct a virtual scene for the user 1330-1 or merge the virtual content with the real scene; the XR device 1313-2 communicates with the electronic device 1310-2 to reconstruct the virtual scene for the user 1330-2 or merge the virtual content with the real scene. In some embodiments, the electronic device 1310-1 and the electronic device 1310-2 can communicate wirelessly. A common virtual scene is constructed for the user 1330-1 and the user 1330-2 without limiting a plurality of users to be in the same physical space. In this disclosure, virtual scenes reconstructed based on VR technology, as well as scenes where virtual content and real scenes are merged based on AR technology or MR technology, are collectively referred to as virtual scenes 1320. User 1330-1 and User 1330-2 can be collectively referred to as User 1330.

The XR device 1310 can be a head-mounted or wearable near-eye display device, such as Head Mounted Display, smart glasses, etc., supporting technologies such as VR, AR, MR, etc. XR device 1310 can include image generation components and optical display components for reconstructing virtual scenes 1320 in a monocular or binocular field of view and displaying virtual objects. Virtual objects can include three-dimensional virtual objects and/or two-dimensional virtual objects. Two-dimensional virtual objects can include two-dimensional windows without thickness for presenting various contents in virtual scenes 1320 similar to electronic screens. For example, display blocks in virtual scenes 1320. Display blocks can be windows for loading web pages, documents, etc., also known as "panels".

In some embodiments, the electronic device 1310 may determine the relative position between a hand of the user 1330 (or its corresponding virtual hand) and the virtual object. The electronic device 1310 may be a separate device capable of communicating with the XR device 1313 and/or other image capture devices, such as servers for image or data processing, computing nodes, etc., or may be integrated with the XR device 1310 and/or other image capture devices. In some embodiments, the electronic device 1310 may be implemented as the XR device 1313, i.e., in this case, the XR device 1310 may implement the functions of the electronic device 1310. It should be understood that the above description of the electronic device 1310 is merely for illustration and not restrictive, and the electronic device 1310 may be implemented in various forms, structures, or categories of devices, embodiments of the present disclosure are not limited thereto.

It should be understood that the structure and function of the environment 1300 are described for illustrative purposes only, without implying any limitation on the scope of the present disclosure.

Figure 14:
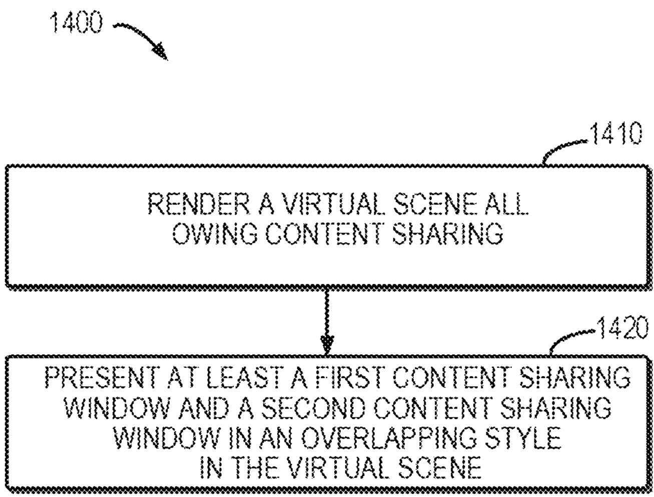
FIG. 14 shows a flowchart of an example process for interacting in a virtual environment according to some embodiments of the present disclosure.

The following will continue to describe some example embodiments of the present disclosure with reference to the accompanying drawings. FIG. 14 shows a flowchart of a method 1400 for interaction in a virtual environment according to some embodiments of the present disclosure. The method 1400 can be performed by the electronic device 1310 in FIG. 13. For ease of discussion, the electronic device 1310 will be described as an example later. However, this is only for illustration without suggesting any limitation as to the scope of the present disclosure. It should be understood that according to embodiments of the present disclosure, it can also be performed by other suitable servers or electronic devices.

In block 1410, the electronic device 1310 renders a virtual scene that allows content sharing. The virtual scene can be drawn by the electronic device 1310 based on images collected from physical scenes in the real world. The physical scene includes real people or things.

According to embodiments of the present disclosure, the electronic device 1310 can obtain an image of the physical scene 1310 in various ways. For example, the image of the physical scene 1310 can be captured by the XR device 1313 worn by the user 1330, and the electronic device 1310 can correspondingly obtain the image of the physical scene 1310 from the XR device 1313. As an alternative, the image of the physical scene 1310 can also be captured by an image capture device (such as a camera, camera, etc.) communicatively connected to the electronic device 1310 and sent to the electronic device 1310. In other alternative implementations, the electronic device 1310 itself may have an image capture function, such as a camera or camera installed.

In this case, the electronic device 1310 can render the virtual scene that allows content sharing based on the collected physical scene in the real world in block 1410.

In block 1420, the electronic device 1310 presents at least a first content sharing window and a second content sharing window in an overlapping style in the virtual scene 1320.

In embodiments of the present disclosure, the first content sharing window may be a content window shared by the user 1330-1, and the second sharing window may be a content window shared by a different user 1330-2. "Presented in an overlapping style" means that one content sharing may be at least partially covered by another sub-container sharing window.

In embodiments of the present disclosure, the priority of the first content sharing window is higher than the priority of the second content sharing window. The first content sharing window has a first depth of field to the current viewpoint which is smaller than the second depth of field to the current viewpoint. In embodiments of the present disclosure, "current viewpoint" involves the viewpoint of the user 1330 viewing the virtual scene 1320 through the XR device 1313.

Figure 15A:
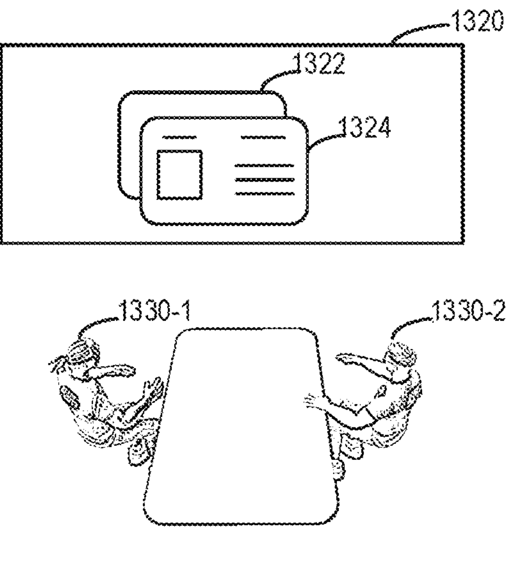
FIG. 15A to 15C show schematic diagrams of a virtual scene for sharing content according to some embodiments of the present disclosure.

As shown in FIG. 15A, the virtual scene 1320 includes a first content window 1322 shared by a user 1330-1 and a second content window 1324 shared by a user 1330-2.

If the user 1330-1 triggers the sharing operation of the first content sharing window 1322 earlier than the user 1330-2, or if the user 1330-1 is currently explaining the content presented by the first content sharing window 1322, the first content sharing window 1322 will have a higher priority than the second content sharing window 1324. Then the first content sharing window 1322 at least partially covers the second content sharing window 1324. In this case, the first depth of field from the first content sharing window 1322 to the current viewpoint is smaller than the second depth of field from the second content sharing window 1324 to the current viewpoint. The refresh rate of the first content sharing window is higher than that of the second content sharing window.

In the scene described in connection with FIG. 15A, the first content sharing window 1322 may be regarded as the currently presented content sharing window, and the second sharing window 1324 may be regarded as a content sharing window to be presented, i.e., a candidate content sharing window. It should be understood that a plurality of candidate content sharing windows may be included in the virtual scene 1320, which may be arranged between the first content sharing window 1322 and the second sharing window 1324 or after the second sharing window 1324.

The electronic device 1310 can perform traffic control on the plurality of content sharing windows, which is advantageous in the case where there are a plurality of candidate content sharing windows in the virtual scene 1320. This can ensure the presentation quality of the currently presented content window, so that it will not have problems such as stagnation due to too many candidate content sharing windows. In addition, the number of candidate content sharing windows can also be controlled to ensure the presentation quality of the currently presented content window.

In the case of presenting the first content sharing window 1322, if a sharing request for another content sharing window is received, the currently presented sharing window can change to another content sharing window. That is to say, the first content sharing window 1322 is replaced by another content sharing window.

Some embodiments will be described with reference to FIGS. 15B to 15C.

In some embodiments, if the electronic device 1310 detects the selection of the second content sharing window 1324, the display of the second content sharing window 1324 is adjusted. As shown in FIG. 15B, the second content window 1324 at least partially covers the first content window 1322. In this case, the first depth of field from the first content sharing window 1322 to the current viewpoint is greater than the second depth of field from the second content sharing window 1324 to the current viewpoint.

In some embodiments, if the electronic device 1310 detects a request to share another content, another content sharing window corresponding to the other content can be presented. As shown in FIG. 15C, the third content sharing window 1326 corresponding to the other content is presented in the virtual scene 1320. The third content sharing window 1326 overlaps at least partially with the first content sharing window 1322 and the second content sharing window 1324. In this case, the third depth of field from the third content sharing window 1326 to the current viewpoint is smaller than the first depth of field from the first content sharing window 1322 to the current viewpoint and the second depth of field from the second content sharing window 1324 to the current viewpoint.

Figure 15B:
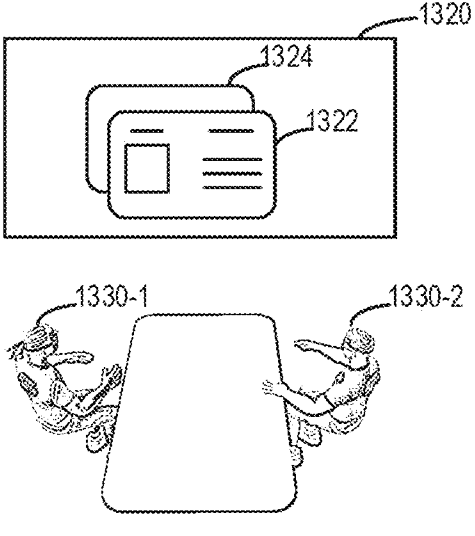
Figures 15C, 16:
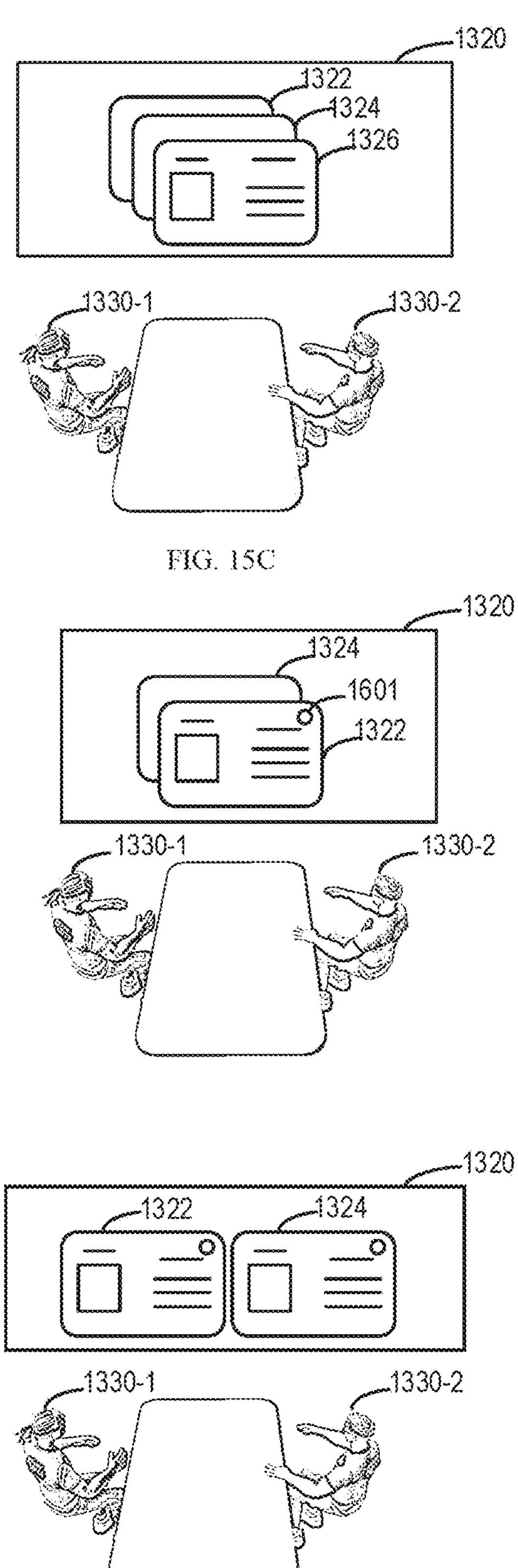
FIG. 16 shows a schematic diagram of a virtual scene regarding shared content according to other embodiments of the present disclosure.

In the embodiment shown in FIGS. 15B and 15C, the selection of the second content sharing window 1324 and/or the sharing request for another content can be input by a user with specific permission. The user is a character in the real world corresponding to the virtual avatar of the virtual scene 1320 rendered for content sharing. For example, if the virtual scene 1320 rendered for content sharing is a conference scene, the user with specific permission can be an organizer or a host of the conference. In some embodiments, the user with special permission can also decide which content windows corresponding to the content expected to be shared can be presented in the virtual scene 1320. In some other embodiments, the user with special permission can also decide the order in which the content windows are presented.

In some embodiments, if the previously presented first content sharing window 1322 is replaced by another content window, the first content sharing window may be arranged at the end of the candidate content sharing windows, as shown in FIG. 15C. In some other embodiments, the first content sharing window 1322 may also be arranged adjacent to the currently presented content sharing window. For example, in a conference scene, it is possible that the discussion of the content presented by the first content sharing window 1322 has not been completed yet and another content sharing window need to be introduced. In this case, the first content sharing window 1322 is arranged adjacent to the currently presented content sharing window to facilitate switching the currently presented content sharing window back to the first content sharing window 1322 after the introduction of the other content window has been discussed.

By combining the solutions described in the above embodiment, the infinite space advantage of the XR scene can be utilized, so that a plurality of users can share different contents at the same time in this scene, and the display layout effect when a plurality of people cast screens is increased. Therefore, on the one hand, the efficiency of obtaining information and displaying information by users is improved, and on the other hand, the presentation quality of the content sharing window can be guaranteed.

In addition, by avoiding the "hard switch" operation when replacing the content sharing window in the traditional scheme (i.e., directly kicking the currently shared content out of the shared screen), users will not have a large cognitive gap when facing the replaced shared content, thereby improving the user experience.

Further, in some embodiments, if a predetermined operation is received, the electronic device 1310 may render the first content sharing window 1322 and the second content sharing window 1324 in a tiled style. As shown in FIG. 16, a user with specific permission, such as user 1330-1, may input an instruction to render the first content sharing window 1322 and the second content sharing window tiled 1324 by triggering the tiling icon 1601. If the instruction is received, the electronic device 1310 may render the first content sharing window 1322 and the second content sharing window tiled 1324 in a tiled pattern in the virtual scene 1320.

Alternatively, or in addition, the style in which the content sharing window is presented in the virtual scene 1320 may also be related to the number of the content sharing windows. Once the number of a set of content sharing windows presented in the virtual scene 1320 changes, the electronic device 1310 determines the presentation style (e.g., in an overlapping style or a tiled style) for presenting the changed set of content sharing windows.

As an example, if a change is detected in the content sharing window (for example, a new content sharing window is added, or an existing sharing window is closed), the electronic device 1310 can re-determine the corresponding overlapping style. Specifically, the electronic device 1310 can determine the corresponding presentation style based on the number of a set of content sharing windows after the change.

In some embodiments, the electronic device 1310 may be predetermine presentation styles corresponding to different numbers. For example, the content sharing windows of a number less than a threshold number can be presented in a tiled style, and content sharing windows of a number reaching the threshold number can be presented in an overlapping style. In this way, embodiments of the present disclosure can improve the degree of adaptation of the window and the scene, thereby ensuring that the contents of the window can be effectively obtained.

Figure 17A:
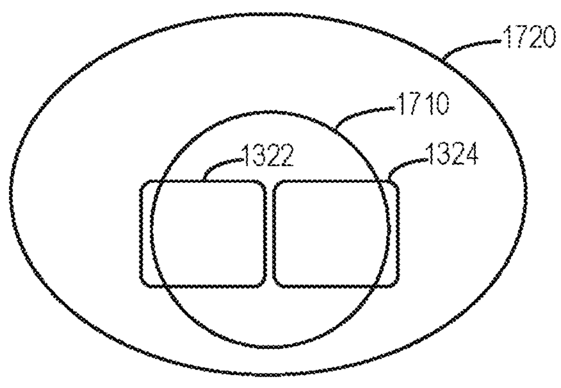
FIG. 17A to 17C show schematic diagrams of layouts of shared content windows according to embodiments of the present disclosure.

The layout of a plurality of tiled content sharing windows can be determined based on the predetermined field of view space associated with the user's current viewpoint. As shown in FIG. 17A, the first content sharing window 1322 and the second content sharing window tiled 1324 presented in a tiled style are mainly presented in a primary visual area 1710 and do not exceed the auxiliary visual area 1720.

Figure 17B:
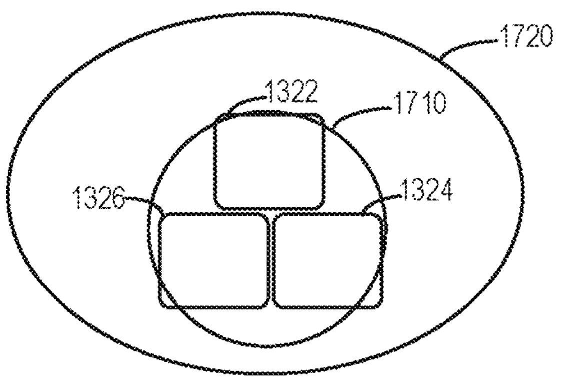

If three content sharing windows are presented in a tiled style, such as the virtual scene 1320 shown in FIG. 15C, then the first content sharing window 1322, the second content sharing window 1324 and the third content sharing window 1326 presented in a tiled style are mainly presented in the primary visual area 1710 and do not exceed the auxiliary visual area 1720, as shown in FIG. 17B.

Figure 17C:
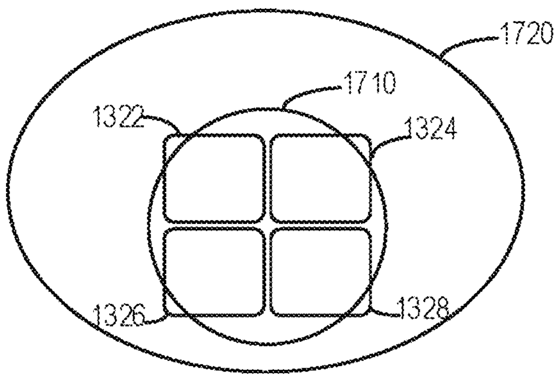

It is also possible to present four content sharing windows in a tiled style. As shown in FIG. 17C, the first content sharing window 1322, the second content sharing window 1324, the third content sharing window 1326 and the fourth content sharing window 1328 presented in a tiled style are mainly presented in the primary visual area 1710 and do not exceed the auxiliary visual area 1720.

It should be understood that, without violating the principle of field of view space, more (such as five or six) content sharing windows can be presented in a tiled style, and the disclosed solution is not limited to those shown in FIGS. 17A to 17C.

By presenting a plurality of content sharing windows in this tiled style in the XR scene, the diversity of user sharing interaction in the virtual scene is further enhanced, the efficiency of user obtaining information and displaying information is improved, and the comfort of user viewing content sharing is also ensured.

In some embodiments, for a multi-user virtual scene, the virtual scene may include a public domain and a private domain. The public domain represents a display domain visible to all users in the virtual scene, while the private domain represents a display domain visible only to specific users in the virtual scene. For example, the content sharing window mentioned above may be displayed in the public domain, for example, so that all users can see it.

Figure 18:
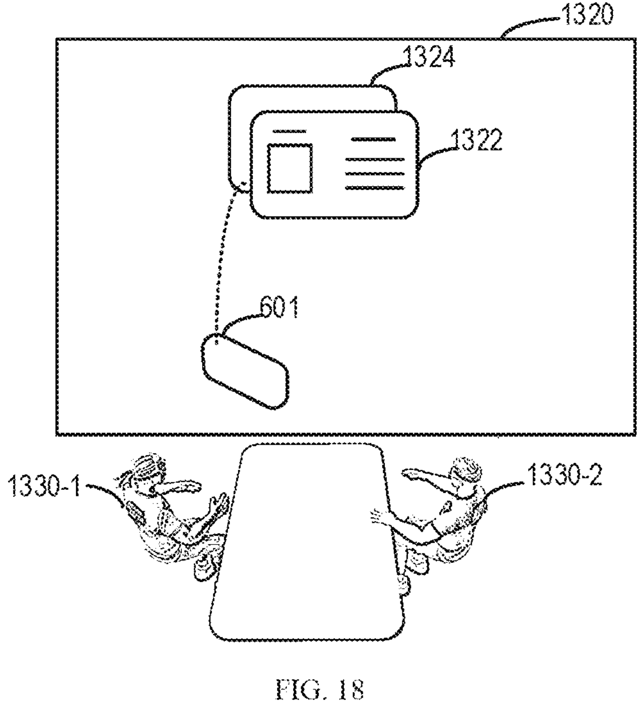
FIG. 18 shows a schematic diagram of a virtual scene regarding shared content according to still other embodiments of the present disclosure.

As shown in FIG. 18, the first content sharing window 1322 and the second content sharing window 1324 may be presented in an overlapping style in the public domain. At this time, the first content sharing window 1322 may have a higher display priority, for example. In some cases, some users may expect to view the second content sharing window 1324 with a lower display priority, but it may be difficult to view effectively because it is obscured.

In some embodiments, the user 1330 may initiate a request for the second content sharing window 1324. For example, the user 1330 may select the second sharing window 1324 with a drag-and-drop operation and drag it to a display domain specific to the user 1330 (i.e., private domain).

Accordingly, upon receiving the request of the user 1330 for the second content sharing window 1324, the electronic device 1310 may present a copy 1801 corresponding to the second content sharing window 1324 in the display domain specific to the user 1330 in the virtual scene. It should be understood that the copy 1801 can synchronously present the content in the second content window 1324. For example, such a request will not change the presentation of the second content sharing window 1324 in the public domain. It should be understood that the user 1330 may also initiate a request for the first content sharing window 1322 or other content sharing windows not shown, to thereby add a copy of the corresponding content sharing window to the private domain of the user 1330 for display. For example, the electronic device 1310 may also present a copy (not shown) corresponding to the first content sharing window 1322 in the display domain specific to the user 1330 in the virtual scene without affecting the effect currently presented in the public domain. In this way, embodiments of the present disclosure can enable each user to freely view a plurality of windows overlapping and presented in the public domain in the private domain. This can improve the flexibly and efficiency of the user in obtaining information and enhance the user experience.

Figure 19:
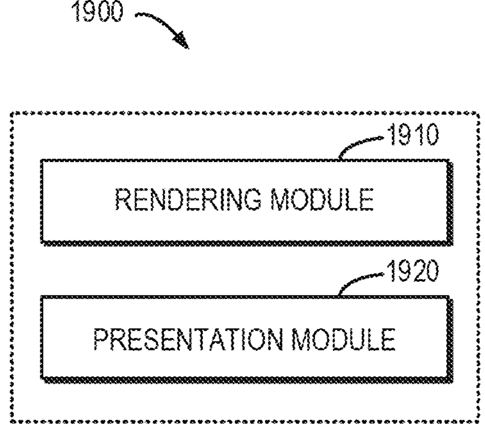
FIG. 19 shows a block diagram of an apparatus for interaction in a virtual environment according to some embodiments of the present disclosure.

Embodiments of the present disclosure also provide a corresponding apparatus for implementing the above method or process. FIG. 19 shows a block diagram of a apparatus 1900 for interaction in a virtual environment according to some embodiments of the present disclosure.

As shown in FIG. 19, the apparatus 1900 includes a rendering module 1910 configured to render a virtual scene that allows content sharing.

In addition, the apparatus 1900 includes a presentation module 1920 configured to present at least a first content sharing window and a second content sharing window in an overlapping style in the virtual scene, the first content sharing window having a higher priority than the second content sharing window, and a first depth of field from the first content sharing window to a current viewpoint being smaller than a second depth of field from the second content sharing window to the current viewpoint.

In some embodiments, the apparatus 1900 may also be configured to: in response to a sharing request for a target content, present a third content sharing window corresponding to the target content, so that the third content sharing window at least partially covers the first content sharing window.

In some embodiments, the second content sharing window has a lower refresh rate than the first content sharing window.

In some embodiments, apparatus 1900 may also be configured to: in response to a selection of the second content sharing window, adjust a display of the second content sharing window such that the first depth of field from the first content sharing window to the current viewpoint is greater than the second depth of field from the second content sharing window to the current viewpoint.

In some embodiments, the apparatus 1900 may also be configured to: in response to receiving a predetermined operation, present the first and second content sharing windows in a tiled style.

In some embodiments, a set of content sharing windows including the first and second content sharing windows are presented in the virtual scene in an overlapping style, and the apparatus 1900 may also be configured to: in response to a change in a number of the set of content sharing windows, determine a presentation style of the changed set of content sharing windows in the virtual scene, the presentation style including the overlapping style or a tiling style.

In some embodiments, the apparatus 1900 may also be configured to: determine the presentation style of the changed set of content sharing windows in the virtual scene based on the number of the set of content sharing windows.

In some embodiments, a layout of the tiled content sharing windows is determined based on a predetermined range of field of view associated with the current viewpoint.

In some embodiments, the apparatus 1900 may also be configured to: in response to a request from a target user for at least one of the first and second content sharing windows, present a copy corresponding to the at least one content sharing window in a display domain specific to the target user in the virtual scene.

Modules included in apparatus 1900 can be implemented in various ways, including software, hardware, firmware, or any combination thereof. In some embodiments, one or more units can be implemented using software and/or firmware, such as machine-executable instructions stored on a storage medium. In addition to or instead of machine-executable instructions, some or all of the modules in apparatus 1900 can be implemented at least in part by one or more hardware logic components. By way of example and not limitation, example types of hardware logic components that can be used include field programmable gate arrays (FPGAs), application specific integrated circuits (ASICs), application specific standards (ASSPs), system-on-chip (SOCs), complex programmable logic devices (CPLDs), and the like.

Figure 20:
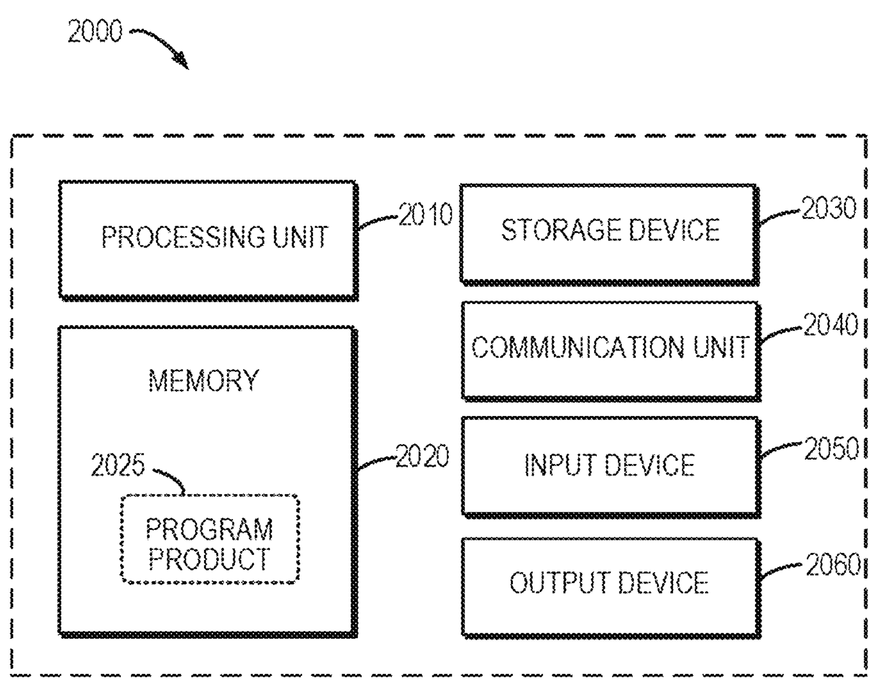
FIG. 20 shows a block diagram of a device capable of implementing embodiments of the present disclosure.

FIG. 20 shows a block diagram of a computing device 2000 in which one or more embodiments of the present disclosure may be implemented. It should be understood that the computing device 2000 shown in FIG. 20 is merely for illustration and should not constitute any limitation on the functionality and scope of the embodiments described herein.

As shown in FIG. 20, computing device 2000 is in the form of a general-purpose computing device. components of computing device 2000 may include, but are not limited to, one or more processors or processing units 2010, memory 2020, storage device 2030, one or more communication units 2040, one or more input devices 2050, and one or more output devices 2060. processing unit 2010 may be an actual or virtual processor and is capable of performing various processes based on programs stored in memory 2020. in a multiprocessor system, a plurality of processing units execute computer executable instructions in parallel to improve the parallel processing capability of computing device 2000.

Computing device 2000 typically includes a plurality of computer storage media. Such media can be any obtainable media accessible to computing device 2000, including but not limited to volatile and non-volatile media, removable and non-removable media. Memory 2020 can be volatile memory (such as registers, caches, random access memory (RAM)), non-volatile memory (such as read-only memory (ROM), electrically erasable programmable read-only memory (EEPROM), flash memory), or some combination thereof. Storage device 2030 can be removable or non-removable media, and can include machine-readable media such as flash drives, disks, or any other media that can be used to store information and/or data (such as training data for training) and can be accessed within computing device 2000.

Computing device 2000 may further include additional removable/non-removable, volatile/non-volatile storage media. Although not shown in FIG. 20, disk drives for reading or writing from removable, non-volatile disks (e.g., "floppy disks") and optical disk drives for reading or writing from removable, non-volatile optical disks may be provided. In these cases, each drive may be connected to a bus (not shown) by one or more data media interfaces. Memory 2020 may include a computer program product 2025 having one or more program modules configured to perform various methods or acts of various embodiments of the present disclosure.

The communication unit 2040 implements communication with other computing devices through a communication medium. additionally, the functions of the components of the computing device 2000 may be implemented as a single computing cluster or a plurality of computing machines capable of communicating through communication connections. thus, the computing device 2000 may operate in a networked environment using logical connections with one or more other servers, a network personal computer (PC), or another network node.

The input device 2050 may be one or more input devices, such as a mouse, keyboard, trackball, etc. The output device 2060 may be one or more output devices, such as a display, speaker, printer, etc. The computing device 2000 may also communicate, as desired, via the communication unit 2040, with one or more external devices (not shown), such as storage devices, display devices, etc., with one or more devices that enable the user to interact with the computing device 2000, or with any device (e.g., network interface card, modem, etc.) that enables the computing device 2000 to communicate with one or more other computing devices. Such communication may be performed via an input/output (I/O) interface (not shown).

According to an example implementation of the present disclosure, there is provided a computer-readable storage medium having computer-executable instructions stored thereon, wherein the computer-executable instructions are executed by a processor to implement the methods described above. According to an example implementation of the present disclosure, there is also provided a computer program product that is tangibly stored on a non-transitory computer-readable medium and includes computer-executable instructions that are executed by a processor to implement the methods described above.

Various aspects of the present disclosure are described herein with reference to flowcharts and/or block diagrams of methods, apparatus, apparatus, and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions may be provided to a processing unit of a general purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions includes an article of manufacture that includes instructions for implementing various aspects of the functions/actions specified in one or more blocks in the flowchart and/or block diagrams.

Computer-readable program instructions can be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks can actually be executed in substantially parallel, and they can sometimes be executed in the opposite order, depending on the functions involved. It should also be noted that each block in the diagrams and/or flowcharts, as well as combinations of blocks in the diagrams and/or flowcharts, can be implemented using a dedicated hardware-based system that performs the specified functions or actions, or can be implemented using a combination of dedicated hardware and computer instructions.

The above has described the various implementations of the present disclosure. The above description is exemplary, not exhaustive, and is not limited to the various implementations disclosed. Without departing from the scope and spirit of the various implementations described, many modifications and changes will be apparent to those skilled in the field. The terminology used in this article is intended to best explain the principles, practical applications, or improvements to the technology in the market, or to enable other ordinary technicians in the field to understand the various implementations disclosed in this article.

We claim:

1. A method for interaction in a virtual environment, comprising:

presenting a first conference layout for a virtual conference in the virtual environment;

detecting a change in participants and/or conference modes of the virtual conference, wherein the change comprises a change in a number of the participants; and adjusting the first conference layout to a second conference layout based at least in part on the change, wherein adjusting to the second conference layout comprises;

adjusting conference layout to the second conference layout based on a reference position for content sharing and a number of the participants in the virtual conference, wherein the second conference layout is determined by:

in response to the number being odd, setting a central conference position at a target position relative to the reference position; and symmetrically setting a plurality of further conference positions based on the reference position and the target position, or in response to the number being even, symmetrically setting a plurality of conference positions corresponding to the number based on the reference position and an orientation of a sharing window for content sharing.

2. The method of claim 1, wherein the change in the number of the participants indicates joining of a first participant, and the central conference position is set to be corresponding to the first participant.

3. The method of claim 1, further comprising:

in response to the conference mode of the virtual conference being a face-to-face mode and a number of participating positions in the first conference layout mismatching a number of participating parties, increasing or decreasing at least one participating position.

4. The method of claim 3, wherein increasing or decreasing at least one participating position comprises:

increasing or decreasing participating positions in pair.

5. The method of claim 1, further comprising:

in response to the conference mode of the virtual conference being a speech mode, the speech mode comprising a speaker position and at least one set of audience positions organized in groups, according to the number of participants in the virtual conference, increasing or decreasing at least one audience position in at least one group of audience positions; or increasing or decreasing the audience positions in groups.

6. The method of claim 1, wherein the change comprises a change in conference mode, and wherein adjusting to the second conference layout comprises:

determining the second conference layout based on the changed conference mode and a number of participants in the virtual conference.

7. The method of claim 1, further comprising:

rendering a desktop area for the virtual conference based on the second conference layout.

8. An electronic device comprising:

at least one processing unit; and at least one memory coupled to the at least one processing unit and storing instructions for execution by the at least one processing unit, the instructions, when executed by the at least one processing unit, causing the device to perform:

presenting a first conference layout for a virtual conference in the virtual environment;

detecting a change in participants and/or conference modes of the virtual conference, wherein the change comprises a change in a number of the participants; and adjusting the first conference layout to a second conference layout based at least in part on the change, wherein adjusting to the second conference layout comprises:

adjusting conference layout to the second conference layout based on a reference position for content sharing and a number of the participants in the virtual conference, wherein the second conference layout is determined by:

in response to the number being odd, setting a central conference position at a target position relative to the reference position; and symmetrically setting a plurality of further conference positions based on the reference position and the target position, or in response to the number being even, symmetrically setting a plurality of conference positions corresponding to the number based on the reference position and an orientation of a sharing window for content sharing.

9. A non-transitory computer-readable storage medium having a computer program stored thereon, the program, when executed by a processor, implementing the method comprising:

presenting a first conference layout for a virtual conference in the virtual environment;

detecting a change in participants and/or conference modes of the virtual conference, wherein the change comprises a change in a number of the participants; and adjusting the first conference layout to a second conference layout based at least in part on the change, wherein adjusting to the second conference layout comprises:

adjusting conference layout to the second conference layout based on a reference position for content sharing and a number of the participants in the virtual conference, wherein the second conference layout is determined by:

in response to the number being odd, setting a central conference position at a target position relative to the reference position; and symmetrically setting a plurality of further conference positions based on the reference position and the target position, or in response to the number being even, symmetrically setting a plurality of conference positions corresponding to the number based on the reference position and an orientation of a sharing window for content sharing.

* * * * *